US008254928B2

(12) United States Patent
Watanabe et al.

(10) Patent No.: US 8,254,928 B2
(45) Date of Patent: Aug. 28, 2012

(54) COMMUNICATION CONTROL APPARATUS AND METHOD

(75) Inventors: Masahiro Watanabe, Kawasaki (JP); Makoto Yoshida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 9 days.

(21) Appl. No.: 12/253,279

(22) Filed: Oct. 17, 2008

(65) Prior Publication Data

US 2009/0104911 A1 Apr. 23, 2009

(30) Foreign Application Priority Data

Oct. 18, 2007 (JP) ................................ 2007-271126

(51) Int. Cl.
*H04W 36/00* (2009.01)
(52) U.S. Cl. ...................... 455/436; 455/414.1; 455/444
(58) Field of Classification Search .................. 455/436, 455/96, 99, 444, 414.1; 370/331
See application file for complete search history.

(56) References Cited

U.S. PATENT DOCUMENTS

| 5,278,991 | A | * | 1/1994 | Ramsdale et al. ............ 455/444 |
| 2002/0019226 | A1 | | 2/2002 | Ezuriko |
| 2003/0235165 | A1 | * | 12/2003 | Wang ............................ 370/331 |
| 2007/0178832 | A1 | | 8/2007 | Gavrilovich |

FOREIGN PATENT DOCUMENTS

| EP | 0 615 391 | 9/1994 |
| GB | 2 242 806 | 10/1991 |
| JP | 11-046380 | 2/1999 |
| JP | 3252825 | 11/2001 |
| JP | 2005-143122 | 6/2005 |
| JP | 2005-354448 | 12/2005 |
| WO | 92/12602 | 7/1992 |

OTHER PUBLICATIONS

Extended European Search Report for corresponding European Patent Application No. 08166944.2, dated Sep. 2, 2009.
European Patent Office "Office Action" issued for corresponding European Patent Application No. 08 166 944.2, dated Mar. 10, 2011.
Japanese Patent Office "Notification of Reasons for Rejection" for corresponding Japanese Patent Application No. 2007-271126, mailed Aug. 16, 2011. English translation.
Japanese Patent Office "Notification of Reasons for Refusal" for corresponding Japanese Patent Application No. 2007-271126, Dispatched Nov. 8, 2011. English translation.

\* cited by examiner

*Primary Examiner* — Md S Elahee
(74) *Attorney, Agent, or Firm* — Myers Wolin, LLC

(57) ABSTRACT

A communication control apparatus that is applied to a wireless communication system in which a mobile terminal can be connected to a fixed base station through a wireless connection to a relay station that is mounted on a moving body, wherein the communication control apparatus includes a detecting unit that detects a change, associated with movement of the moving body on which the relay station is mounted, of a communication environment between the mobile terminal and the relay station, a control unit that controls a handover of the mobile terminal according to the change, detected by the detecting unit, of communication environment between the mobile terminal and the relay station.

12 Claims, 18 Drawing Sheets

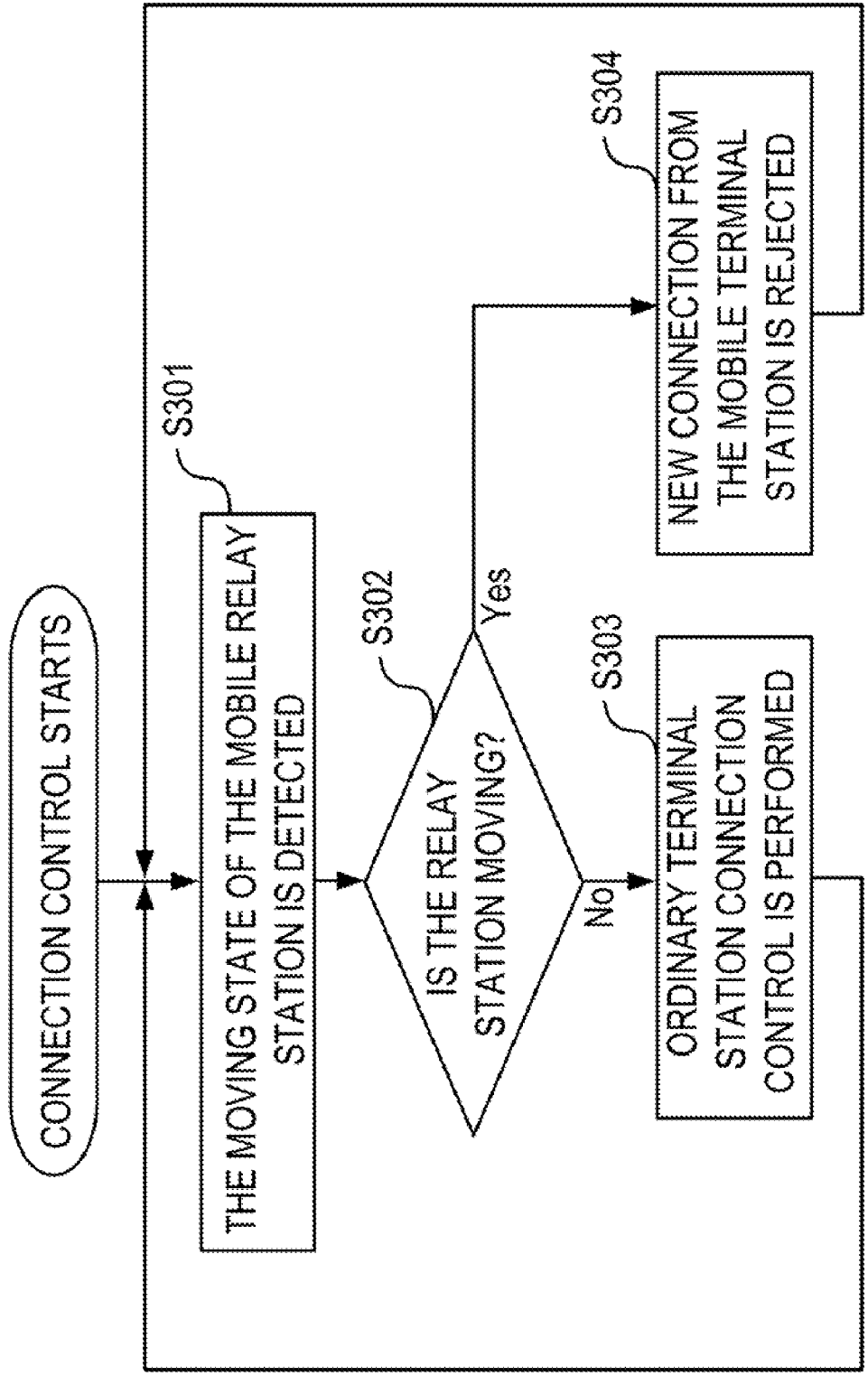

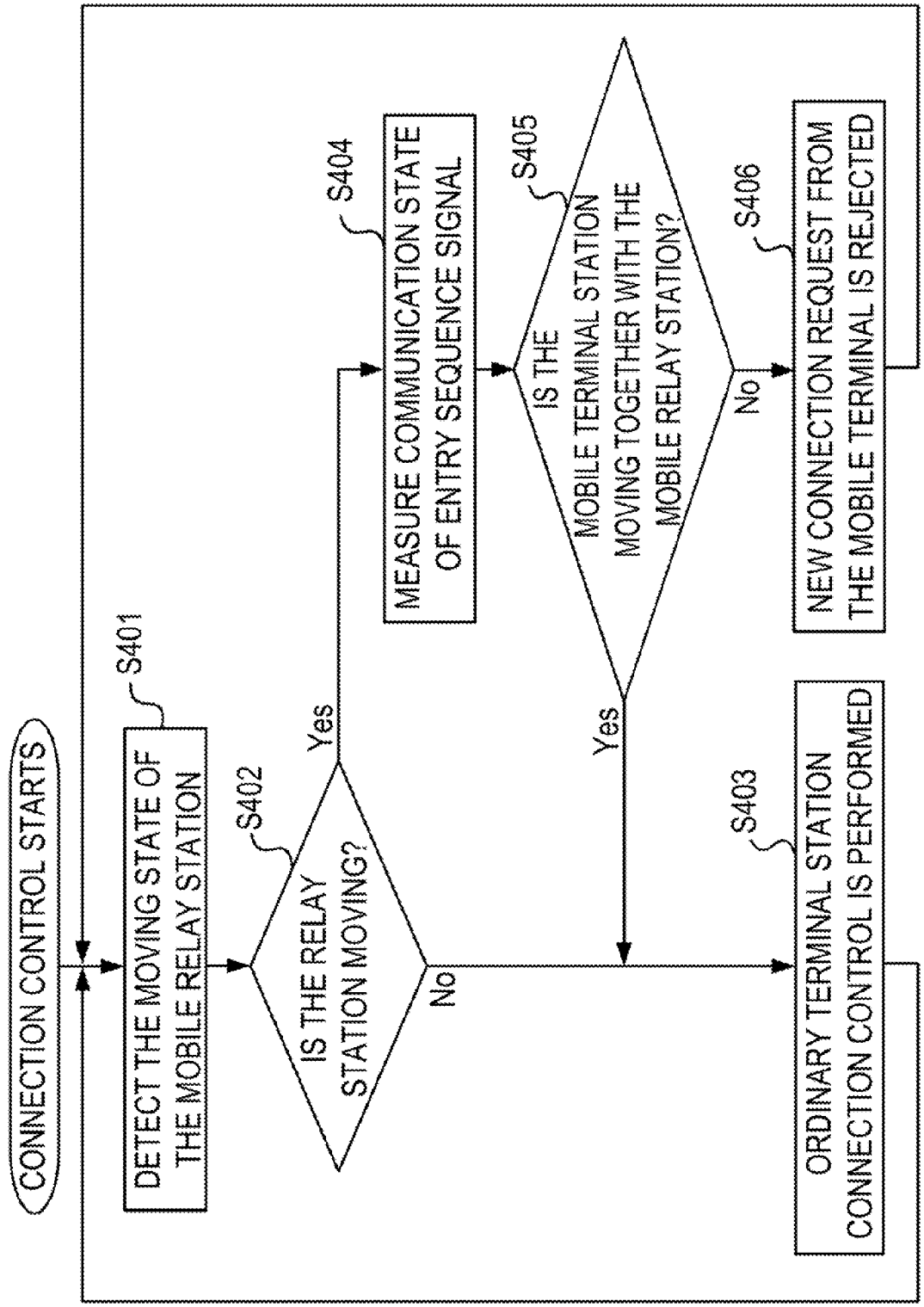

FIG. 12

| FIG.12A |
|---|
| FIG.12B |

FIG. 12A

EXAMPLES OF FLUCTUATION ELEMENTS WHICH CAN BE GRASPED BY THE RELAY STATION AND THRESHOLD VALUE PROCESSING

| PARAMETER | RECEIVING POWER | SINR | DATA ERROR RATE | POWER INSTRUCTION VALUE | DOPPLER SHIFT |
|---|---|---|---|---|---|
| RELAY STATION COVERAGE AREA | CHANGE THE THRESHOLD VALUE OF THE DEVIATION JUDGMENT BECAUSE OF THE SIZE OF THE VEHICLE (THE DIFFERENCE BETWEEN A BUS AND A TRAIN FLUCTUATION BY VEHICLE CONNECTION OF THE TRAIN OR THE LIKE) | ↓ | ↓ | ↓ | — |
| VEHICLE SHAPE | CHANGE THE THRESHOLD VALUE BECAUSE OF A SHIELDING STATE (GOOD VISIBILITY PRIVATE ROOMS OR THE LIKE) BETWEEN THE RELAY STATION AND THE TERMINAL | ↓ | ↓ | ↓ | — |
| NUMBER OF CONNECTION USERS | CHANGE THE THRESHOLD VALUE ACCORDING TO AN INTERFERENCE INCREASE (IN THE CASE OF CDMA) BECAUSE OF THE CONGESTION / CHANGE THE THRESHOLD VALUE WITH RESPECT TO THE FLUCTUATION RATE BECAUSE THE COMMUNICATION ASSIGNMENT INTERVAL CHANGES (IN THE CASE OF TDMA) | ↓ | ↓ | ↓ | — |
| AMBIENT SURROUNDING | CHANGE THE THRESHOLD VALUE BECAUSE THE MOBILE RELAY STATION CHANGES DEPENDING ON THE ENVIRONMENT DURING MOVEMENT (SUCH AS A CITY AREA, THE SUBURBS, INFLUENCE OF TERRAIN, AND THE NUMBER OF SURROUNDING USERS) EVEN THOUGH THE RELATIVE POSITIONS OF THE RELAY STATION AND THE TERMINAL ARE THE SAME | ↓ | ↓ | ↓ | THE VEHICLE MOVING SPEED CHANGES BECAUSE OF ROAD CONGESTION |

FIG. 12

| FIG.12A |
|---|
| FIG.12B |

EXAMPLES OF FLUCTUATION ELEMENTS WHICH CAN BE GRASPED BY THE RELAY STATION AND THRESHOLD VALUE PROCESSING

| PARAMETER | INCOMING POWER | SINR | DATA ERROR RATE | POWER INSTRUCTION VALUE | DOPPLER SHIFT |
|---|---|---|---|---|---|
| VEHICLE MOVING SPEED | CHANGE THE THRESHOLD VALUE BECAUSE OF THE FLUCTUATION RATE WHEN THE TERMINAL DEVIATES ACCORDING TO THE VEHICLE MOVING SPEED | ↓ | ↓ | ↓ | CHANGE THE DOPPLER SHIFT THRESHOLD VALUE FOR THE DEVIATION JUDGMENT BECAUSE OF THE VEHICLE CHARACTERISTICS (THE SPEED OF ACCELERATION WHEN THE VEHICLE STARTS MOVING AND THE MOVING SPEED) |
| TERMINAL MOVING SPEED | CHANGE THE THRESHOLD VALUE BECAUSE OF THE MOVING SPEED CHARACTERISTIC OF THE BOARDING VEHICLE ACCORDING TO A VEHICLE TYPE | ↓ | ↓ | ↓ | — |
| PLACE | EASE THE DEVIATION JUDGMENT CONDITION IN AREAS SUCH AS A STATION AND A BUS STOP WHERE A USER BOARDS AND GETS OFF A VEHICLE | ↓ | ↓ | ↓ | — |
| PERIOD OF TIME (DAY, WEEKDAY/WEEKEND, AND WHEN EVENTS ARE TAKEN PLACE) | INCREASE AND DECREASE THE NUMBER OF SURROUNDING USERS AND CONNECTION USERS BECAUSE OF POPULATION CHANGES ACCORDING TO THE TIME PERIOD | ↓ | ↓ | ↓ | THE VEHICLE MOVING SPEED CHANGES BECAUSE OF ROAD CONGESTION |

| FIG.13A |
| FIG.13B |

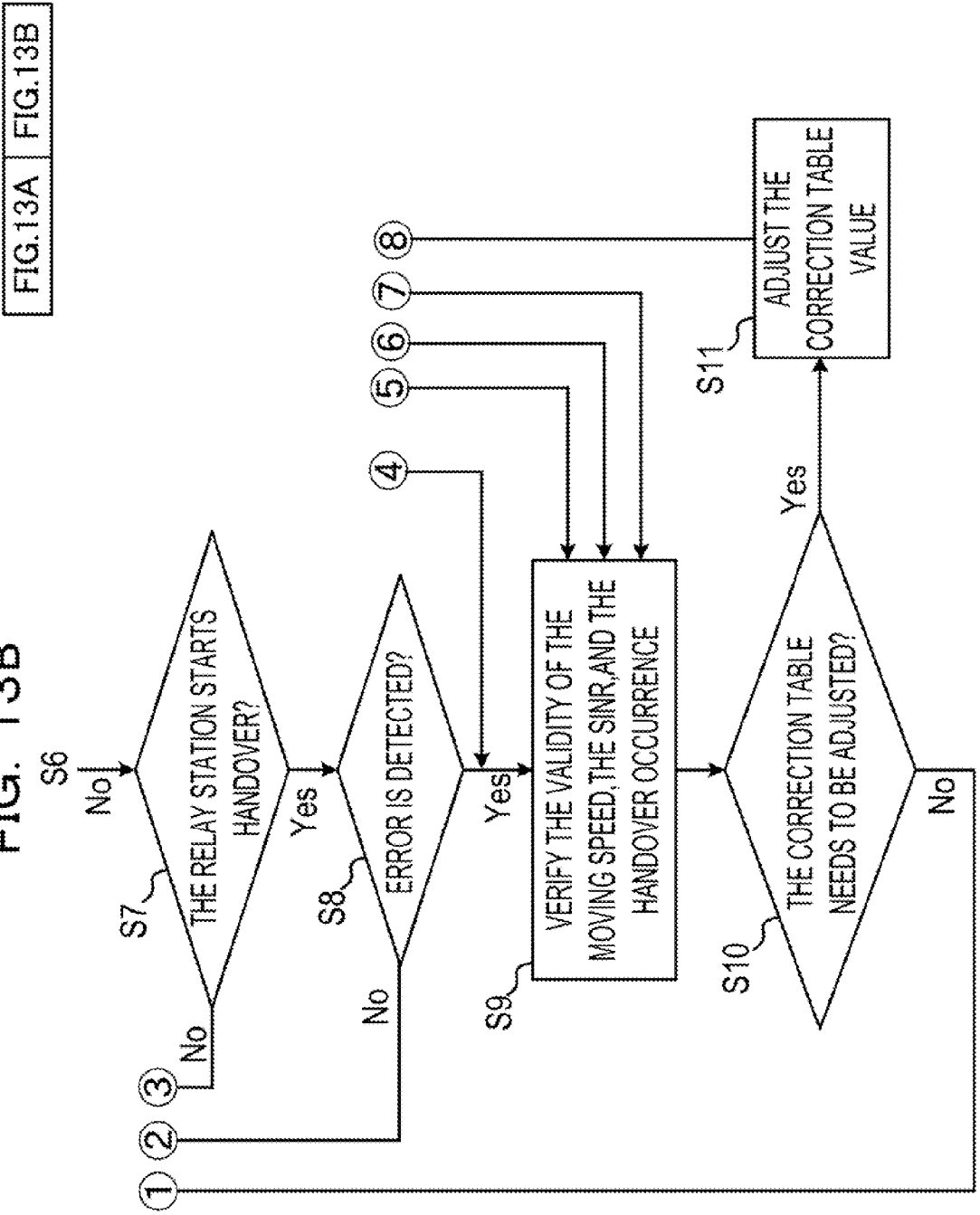

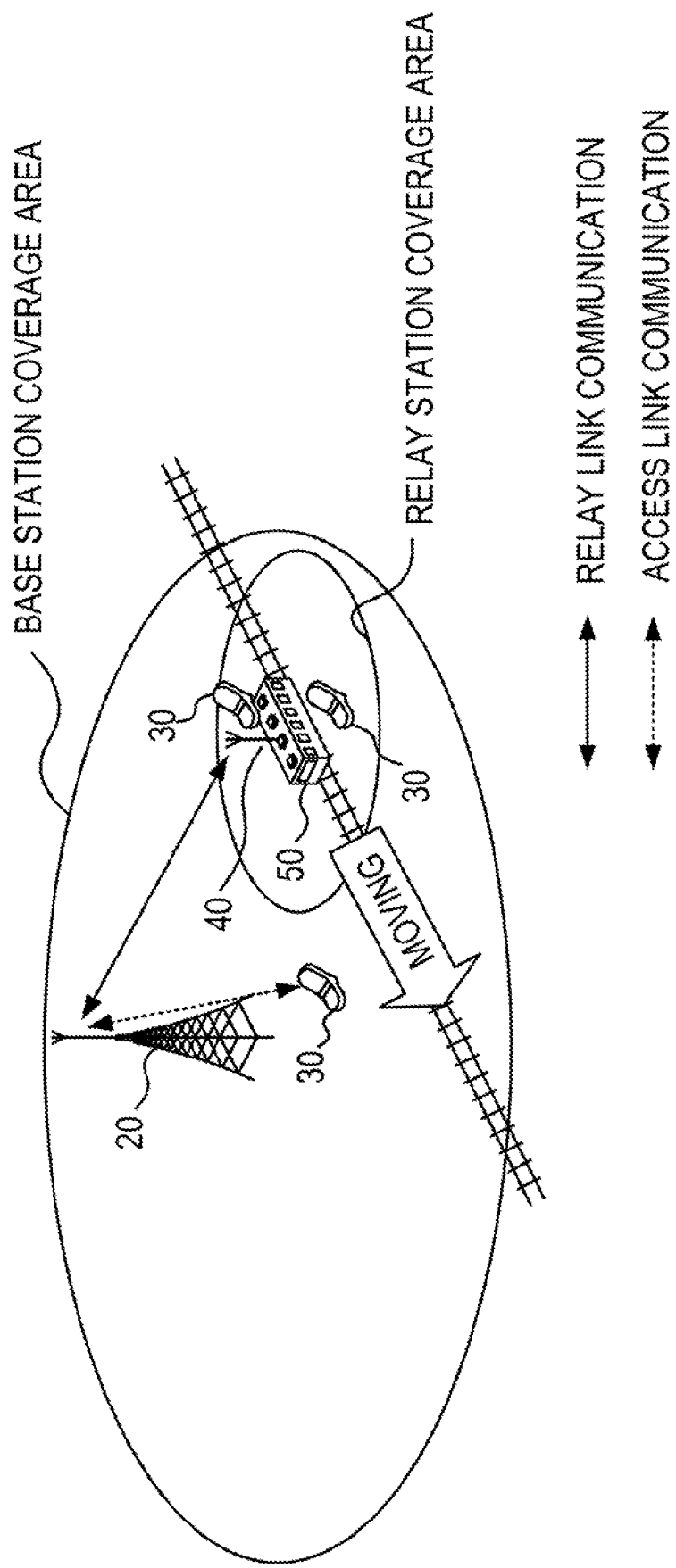

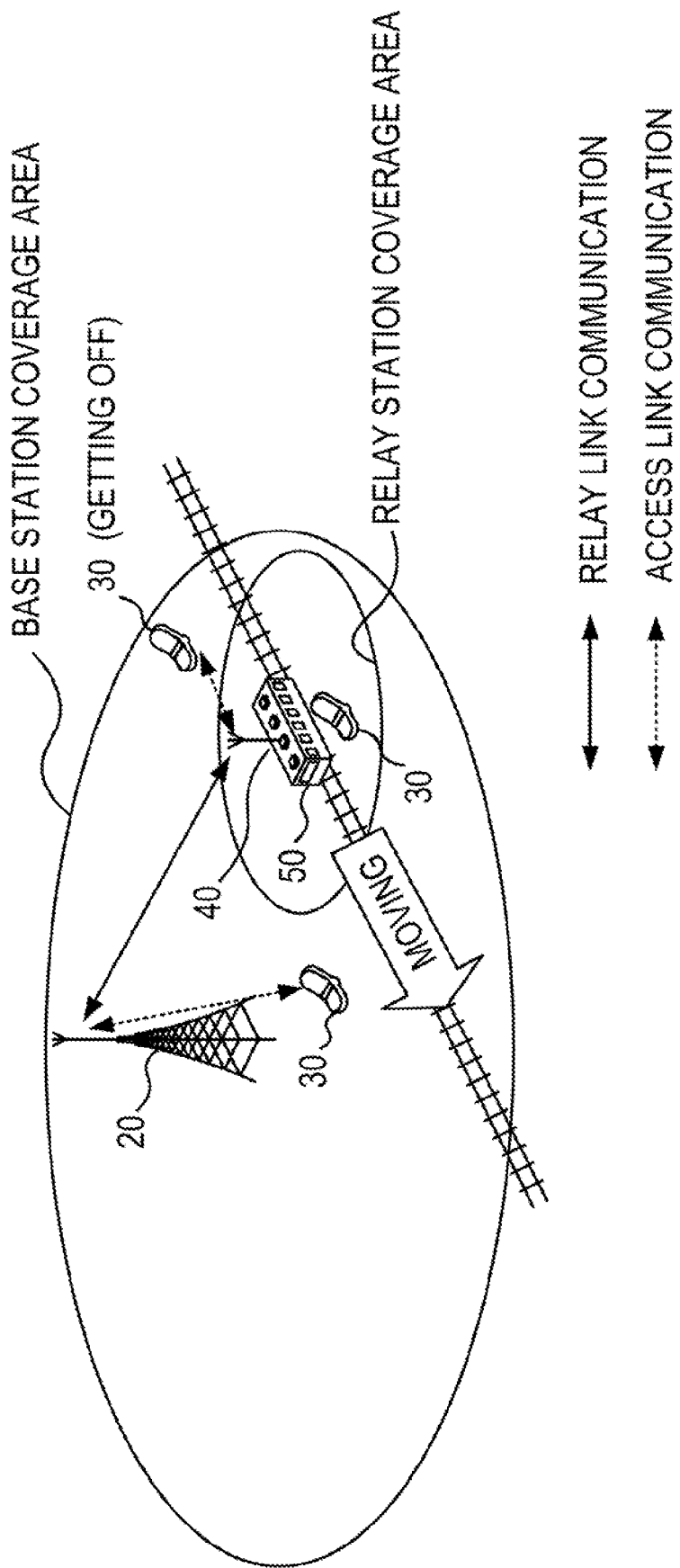

COMMUNICATION CONTROL APPARATUS AND METHOD

CROSS-REFERENCE TO RELATED APPLICATIONS

This application is based upon and claims the benefit of priority of the prior Japanese Patent Application No. 2007-271126, filed on Oct. 18, 2007, the entire contents of which are incorporated herein by reference.

FIELD

The embodiments disclosed herein are related to a communication control apparatus and a communication control method adapted to a radio communication system.

BACKGROUND

Recently, in mobile communication, high-speed access and throughput performance have been improved as distribution of contents such as internet access, streaming broadcast, music, and video has increased as contrasted to voice-based communication by, for example, a conventional mobile phone.

In mobile communications, a method for allocating a relay station in a moving body has been considered as an improvement plan for the case where a user is on board the moving body where quality and throughput cannot be guaranteed by utilizing only a fixed wireless base station.

For handover processing of a system using a mobile relay station, as discussed in, for example, "handover method" (Japanese Laid-Open Patent Publication No. 2005-354448), a method for starting the handover processing between a fixed access point and a mobile relay station based on a travelling direction and speed of the moving body is disclosed. Further, "Automatic Radio Wave Output Limiting System In Mobile Phone" (U.S. Pat. No. 3,252,825) discusses user terminal inhibit processing in a speech inhibit area in the moving body.

FIG. 14 is a configuration diagram of a communication system 10 using a mobile relay station 40. As shown in FIG. 14, the mobile relay station 40, mounted on a moving body 50 such as a train, relays the communication between a mobile communication terminal 30 on the moving body 50 and a fixed wireless base station 20. A communication between the (fixed) wireless base station 20 and the mobile relay station 40 is called a relay link communication. A communication between the (fixed) wireless base station 20 and the mobile communication terminal 30, or between the mobile relay station 40 and the mobile communication terminal 30 is called an access link communication. Further, the transmission from the (fixed) wireless base station 20/the mobile relay station 40 to the mobile communication terminal 30 is called a forward link communication. Reversely, the transmission from the mobile communication terminal 30 to the (fixed) wireless base station 20/the mobile relay station 40 is called a reverse link communication.

Generally, in mobile communication, as the mobile communication terminal 30 moves, the handover processing occurs between the fixed wireless base station 20 and the mobile relay station 40. The handover processing is started by monitoring, mainly by the mobile communication terminal 30, a received signal from each of the fixed wireless base station 20 and the mobile relay station 40, respectively and detecting that a condition for handover processing is satisfied.

Further, as shown in FIG. 15, when a user of the mobile communication terminal 30 connected to the mobile relay station 40 gets off the moving body 50 and then the moving body 50 starts moving, communication quality deteriorates rapidly because of the movement of the mobile relay station 40 even though the movement amount of the mobile communication terminal 30 is small.

Further, the coverage area of the mobile relay station 40 may be generated around the moving body 50 because of radio wave leakage from inside the moving body 50. The coverage area moves together with the mobile relay station 40. As depicted in FIG. 16, when the mobile relay station 40 passes near the mobile communication terminal 30 that is not moving together with the mobile relay station 40, transmission quality to the mobile relay station 40 temporally becomes better than that to another fixed wireless base station 20 or another fixed relay station, and then a communication link may be established between the mobile relay station 40 and the mobile communication terminal 30. However, the mobile relay station 40 quickly moves away from the mobile communication terminal 30. Accordingly, the mobile communication terminal 30 has to be connected to the original fixed wireless mobile station 20 or other relay station by again performing handover processing. This series of procedures places extra load on the mobile communication terminal 30, the mobile relay station 40, and the fixed wireless base station 20. Further, a new connection to the mobile relay station 40 may be made because the power of the mobile communication terminal 30 that is moving with the moving body 50 together with the mobile relay station 40 is turned on, or because the mobile communication terminal 30 boards the moving body 50 while being connected to the fixed wireless base station 20 and then a handover to the mobile relay station 40 is required during the movement of the moving body 50.

SUMMARY

Accordingly, it is an object in one aspect of the invention to provide a communication control apparatus and a communication control method which enables handover process for a mobile terminal effectively.

The present invention in one aspect controls handover according to a change of a communication environment between a mobile terminal and a relay station.

According to one aspect, for example, a communication control apparatus applied to a wireless communication system in which a mobile terminal can be wirelessly connected to a fixed base station through a wireless connection to a relay station mounted on a moving body, includes a detecting unit that detects a change of communication environment between the mobile terminal and the relay station associated with movement of the moving body with the relay station, and a control unit that controls the handover of the mobile terminal according to the detected change of communication environment between the mobile terminal and the relay station.

Further, for example, according to another aspect, a communication control method for a wireless communication system in which a mobile terminal can be wirelessly connected to a fixed base station through a wireless communication to a relay station mounted on a moving body, includes detecting a change of communication environment between the mobile terminal and the relay station associated with a movement of the moving body with the relay station and controlling a handover of the mobile terminal according to the detected change of communication environment between the mobile terminal and the relay station.

Additional objects and advantages of the invention (embodiment) will be set forth in part in the description which follows, and in part will be obvious from the description, or maybe learned by practice of the invention. The object and advantages of the invention will be realized and attained by means of the elements and combinations particularly pointed out in the appended claims.

It is to be understood that both the foregoing general description and the following detailed description are exemplary and explanatory and are not restrictive of the invention, as claimed.

BRIEF DESCRIPTION OF DRAWINGS

FIG. 10 is an operational flow diagram of the mobile relay station of the third embodiment;

FIG. 11 is an operational flow diagram of the mobile relay station of the third embodiment;

FIG. 12 is a diagram showing an factor to determine a threshold value;

FIG. 14 is a configuration of a conventional communication system;

FIG. 15 is a configuration of the conventional communication system; and

DESCRIPTION OF EMBODIMENTS

Figure 1:
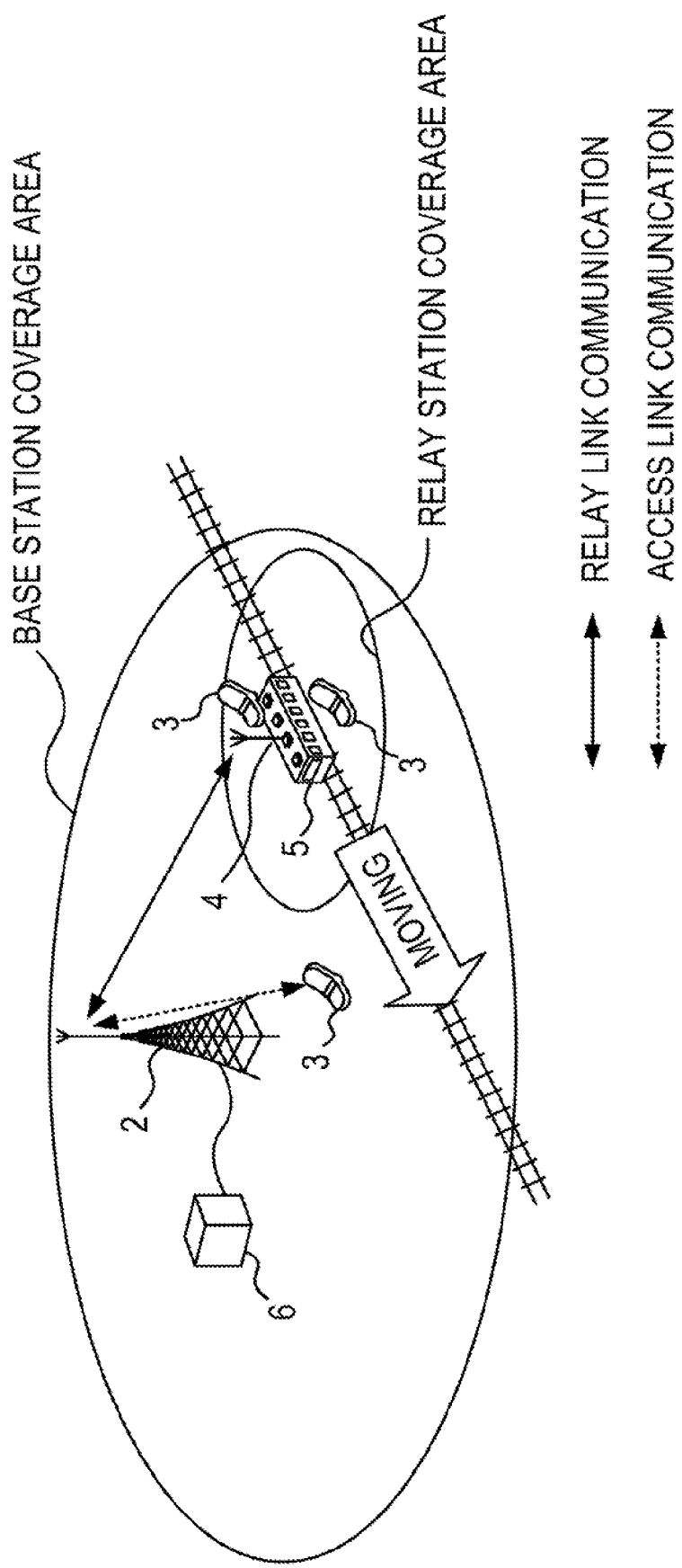
FIG. 1 is an example configuration of a communication system of a first embodiment.

Preferred embodiments of the present invention will be explained with reference to accompanying drawings.

Exemplary embodiments describe a communication control apparatus applied to a wireless communication system in which a mobile terminal can be wirelessly connected to a fixed base station through a wireless connection to a relay station mounted on a moving body, wherein the communication control apparatus includes a detecting unit that detects a change of a communication environment between the mobile terminal and the relay station associated with a movement of the moving body with the relay station, and a control unit that controls a handover of the mobile terminal according to the change of the communication environment between the mobile terminal and the relay station, detected by the detecting unit.

Accordingly, the handover of the mobile terminal is controlled according to the change of the communication environment between the mobile terminal and the relay station. This makes it possible to perform appropriate handover processing according to a moving state of the moving body with the relay station. For example, it is possible to improve communication quality of the mobile terminal and to effectively utilize a communication band.

The change of the communication environment affects the wireless communication between the fixed base station and the mobile terminal. For example, there may be a change in state where the communication quality gradually deteriorates because the mobile terminal having an access link deviates from the relay station. The deviation indicates that the mobile terminal has transited from a state where the mobile terminal is mounted on the moving body to a state where the mobile terminal is not mounted on the moving body. At this time, the distance between the mobile terminal and the relay station rapidly changes because of the movement of the moving body, so that the mobile terminal moves away from a coverage area of the relay station.

The detecting unit can detect this change by analyzing the communication quality between the mobile terminal and the relay station, and the control unit can instruct a handover to the mobile terminal if the communication quality deviates from a predetermined condition.

By analyzing the communication quality between the mobile terminal and the relay station, it is possible to easily detect the change of communication environment between the mobile terminal and the relay station associated with the movement of the moving body with the relay station. The predetermined condition is a condition for judging whether or not the mobile terminal deviates from the relay station, and is a parameter, for example, of the communication quality of the case when the mobile terminal has not deviated from the relay station.

The detecting unit can detect this change of communication environment by analyzing the communication quality between the mobile terminal and the relay station, and the control unit can instruct a handover of the mobile terminal if the communication quality deviates from the condition using a statistical parameter that is a standard for judging whether or not the mobile terminal maintains the wireless connection to the relay station.

Accordingly, it is possible to set an appropriate threshold value according to a situation surrounding the relay station or the like.

In this case, the coverage area of the relay station may be an area in which the relay station can relay transmission signals from the mobile station to the fixed base station or transmission signals from the fixed base station to the mobile station, may be an area, for example, in which the relay station and the mobile terminal can communicate with each other. The statistical parameter is a parameter indicating that the mobile terminal has deviated from the relay station, and is, for example, a parameter of the communication quality of the mobile terminal in the case when the mobile terminal is near a border between the inside and the outside of the coverage area of the relay station, or is a parameter of the communication quality of the mobile terminal in the case when the relay station is in an area where various wireless communications are crossed.

Further, the communication quality can be determined by at least one of the standards: receiving power, signal power to interference and noise power ratio, data error rate, power instruction value to the mobile terminal performing transmission power control, and Doppler shift.

A receiving power and a signal power to interference plus noise power ratio (hereinafter referred to as SINR) of the radio wave reaching the relay station from the mobile terminal, a data error rate, and a power instruction value to the mobile terminal performing transmission power control gradually decreases as the distance between the relay station and the mobile terminal becomes larger. When a relative speed of the mobile terminal and the relay station changes, the communication between the mobile terminal and the relay station is affected by Doppler effect. Therefore, by analyzing these parameters, it is possible to detect the change of communication environment between the relay station and the mobile terminal.

The detecting unit can detect the change of communication environment by determining whether or not the moving body is moving. The control unit can permit the wireless handover connection of the mobile terminal to the relay station when the moving body is stopped, and can inhibit the wireless handover connection of the mobile terminal to the relay station when the moving body is moving.

Accordingly, handover control in accordance with a moving state of the relay station becomes possible. The handover is permitted when the moving body is stopped. The handover is inhibited when the moving body is moving. Therefore, for example, if a relay station mounted on a moving body passes near a mobile terminal at high speed, the mobile terminal may attempt to perform handover to the relay station temporarily, however, the relay station can prevent the mobile terminal from being connected. That is, for example, it is possible to decrease occurrences of useless processing in the fixed base station, the relay station, and the mobile terminal, and to prevent useless band consumption by exchanging messages related to the handover or the like.

Further, the detecting unit detects the change of communication environment based on whether or not the moving body is moving and an analysis of the communication quality. The control unit permits the wireless handover connection from the mobile terminal to the relay station when the moving body is stopped and the communication quality satisfies the predetermined condition, and inhibits the wireless handover connection from the mobile terminal to the relay station when the moving body is moving and the communication quality deviates from the predetermined condition.

In another case, where the moving body is stopped or when the moving body is moving and the communication quality satisfies the predetermined condition is the case when both of the mobile terminal and the relay station are not moving or the case when the mobile terminal on the moving body moves together with the relay station.

Further, the case when the moving body is moving and the communication quality deviates from the predetermined condition is, for example, the case when the mobile terminal is not onboard the moving body and the distance between the mobile terminal and the relay station changes rapidly.

Accordingly, it is possible to identify the moving state of the relay station and the moving state of the mobile terminal, and then handover control in accordance with each moving state becomes possible. For example, even if the power of the mobile terminal is not turned on when the mobile terminal boards the moving body or if the connection state with another fixed base station or relay station is maintained when the mobile terminal boards the moving body and then the handover is started after the moving body starts moving, an entry of the mobile terminal for a new connection request transmitted after the moving body starts moving can be received by the relay station mounted on the moving body. Accordingly, it is possible to perform a connection control to the mobile terminal that is onboard the moving body while preventing a temporal connection to the moving relay station when the mobile terminal is not onboard the moving body.

Description is made below of the reason why the handover is controlled based on whether or not the moving body is moving and the analysis result of the communication quality.

By analyzing the receiving power and SINR of the radio wave received by the relay station from the mobile terminal while the moving body is moving, the data error rate, the power instruction value of the mobile terminal performing a transmission power control or the like, it can be determined whether or not the mobile terminal is onboard the moving body, and then the handover processing or the like can be performed according to a determination result. For example, the SINR of the radio wave reaching the relay station from the mobile terminal decreases because of influence of path loss and transmission path fluctuation as the distance between the relay station and the mobile terminal increases. On the other hand, the SINR of the radio wave to be transmitted from the mobile terminal that is onboard the moving body to the relay station has little change because the distance fluctuation between the relay station and the mobile terminal and the change of the transmission path condition are small. This can be distinguished from the deviation from the relay station based on the movement condition of the moving body and the communication quality. Further, by analyzing the Doppler shift of the radio wave transmitted from the mobile terminal, it is also possible to tell whether or not the mobile terminal has deviated from the relay station. In general, this is because the moving speed of the relay station mounted on the moving body is higher than that of the mobile terminal that is moving inside the moving body.

Another embodiment uses the communication control method applied to the wireless communication system in which the mobile terminal can be wirelessly connected through the wireless connection to the relay station mounted on the moving body, wherein the communication control method includes detecting the change of communication environment between the mobile terminal and the relay station associated with the movement of the moving body with the relay station, and controlling the handover of the mobile terminal according to the detected change of communication environment between the mobile terminal and the relay station.

[a] First Embodiment

FIG. 1 is a diagram showing an example configuration of a communication system 1 according to a first embodiment. As depicted in FIG. 1, the communication system 1 includes a fixed wireless base station 2, a mobile communication terminal (mobile terminal) 3, a mobile relay station 4 that relays a wireless communication between the fixed wireless base station 2 and the mobile communication terminal 3. For convenience of description, the fixed wireless base station 2 and the mobile relay station 4 are depicted one by one in FIG. 1, but it is assumed that many of them are allocated in a neighboring area or the like. Further, three mobile communication terminals 3 are shown in FIG. 1, but the present embodiment is not limited to the three mobile communication terminals. There can be less than two or more than four mobile communication terminals 3. The mobile relay station 4 is mounted on a moving body such as vehicle 5 of a train and moves together with the vehicle 5.

The fixed wireless base station 2 communicates with the mobile communication terminal 3, the mobile relay station 4, and an upper device 6 (a base station control device, RNC (Radio network controller), ASN-GW (Access Service Network Gateway) or an exchanger). The mobile communication terminal 3 is a mobile terminal such as a mobile phone and a PDA (Personal Digital Assistant). The mobile communication terminal 3 has a handover function for monitoring strength or the like of the radio power of the fixed wireless base station 2 and the mobile relay station 4 to switch to a channel having the best sensitivity, so that the communication is not disconnected even while the mobile communication terminal 3 is moving. In the present embodiment, the fixed wireless base station 2 and the mobile communication terminal 3 have communication functions to perform wireless communication.

Figure 2:
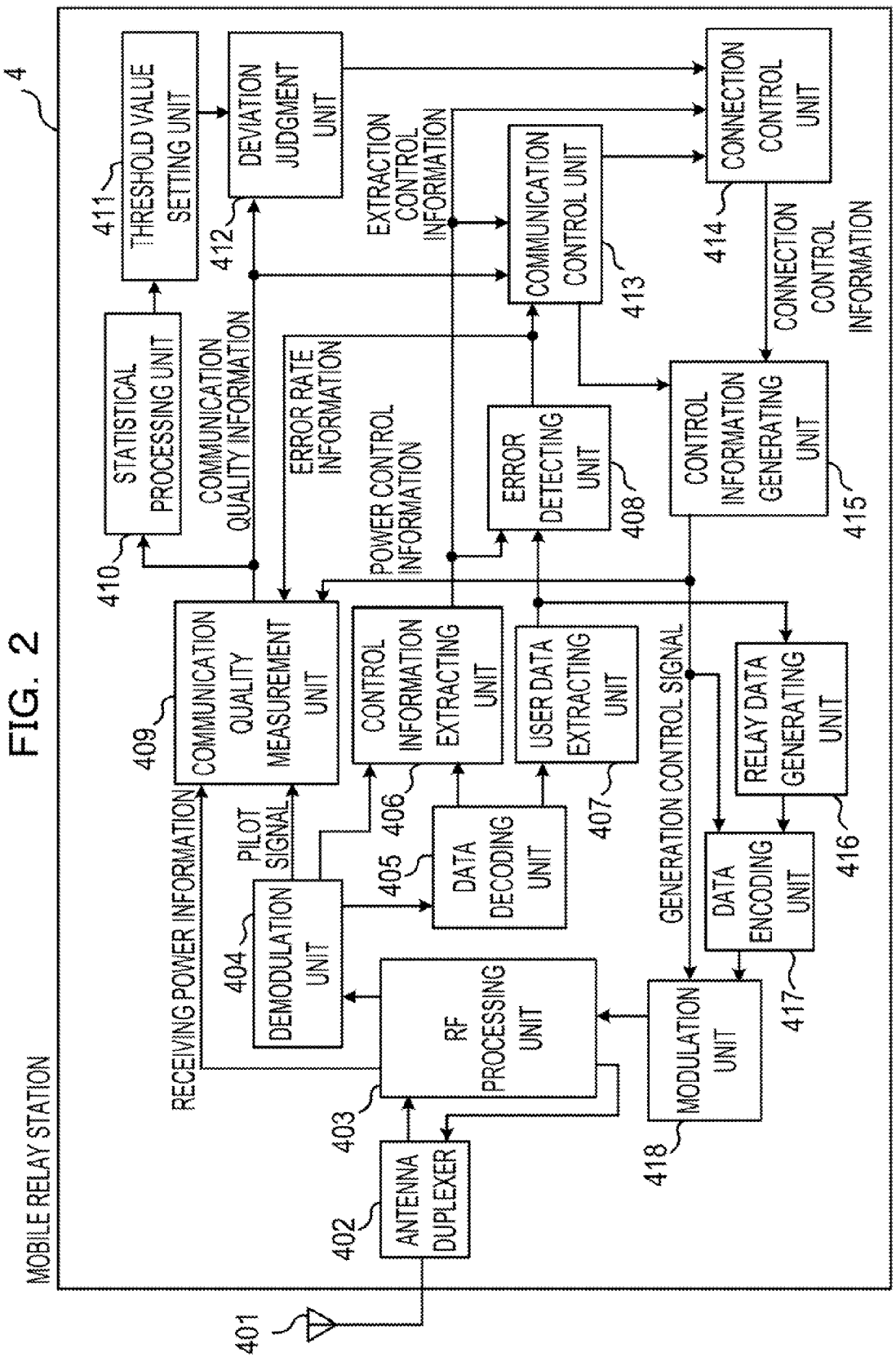
FIG. 2 is an example configuration of a mobile relay station of the first embodiment.

FIG. 2 is a diagram showing an example configuration of the mobile relay station 4. As shown in FIG. 2, to perform the communication between the fixed wireless base station 2 and the mobile communication terminal 3, the mobile relay station 4 includes a transmission/reception duplex antenna 401, an antenna duplexer 402 to perform transmission and reception by a single transmission/reception duplex antenna 401, and an RF processing unit 403 (RF: Radio Frequency) to process signals. The RF processing unit 403 including a transmission/reception amplifier, a filter, a frequency converter, an A/D converter, a D/A converter, and a quadrature modem converts the received RF signal into a digital baseband signal, and the digital baseband signal to be transmitted into an RF signal. Further, the RF processing unit 403 performs communication by a time division multiplexing method, and can measure the receiving power of the mobile communication terminal 3. Further, in the present embodiment, communication is performed by a single transmission/reception duplex antenna 401 switching from a relay link communication to an access link communication. However, the present embodiment is not limited to such an embodiment. That is, the mobile relay station 4 can include an antenna for relay link communication and an antenna for access link communication, and can perform relay link communication and access link communication at the same time by doubly mounting each function block. Further, in the present embodiment the communication with a plurality of mobile communication terminals 3 is performed by the time division multiplexing method. However, a communication method other than the time division multiplexing method is applicable to the present embodiment.

Further, the mobile relay station 4 includes a demodulation unit 404, a data decoding unit 405, a control information extracting unit 406, and a user data extracting unit 407 in order to obtain various information from received signals. The demodulation unit 404 demodulates a modulated signal transmitted from the RF processing unit 403 based on the analysis result of the control information. The data decoding unit 405 performs decoding processing on the demodulated signal to obtain the data. The data decoding unit 405 performs processing for decoding the data that is encoded at the transmission in the mobile communication terminal 3 or the fixed wireless base station 2. The control information extracting unit 406 extracts the control information related to the communication control from the signal that is demodulated by the demodulation unit 404 or the data that is decoded by the data decoding unit 405. The user data extracting unit 407 extracts the data specific to the user (e.g., the data related to a telephone call) from the obtained data.

Further, the mobile relay station 4 includes an error detecting unit 408 and a communication quality measurement unit 409. The error detecting unit 408 detects a communication error from CRC information (CRC: Cyclic Redundancy Check) or the like included in the information extracted by the control information extracting unit 406 and calculates an error rate or the like. The communication quality measurement unit 409 measures the communication quality (at least one of the communication qualities such as the receiving power, the SINR, the data error rate (an error rate in the wireless link), the power instruction value to the mobile terminal performing the transmission power control, and the Doppler shift) based on for example, the error rate information obtained by the error detecting unit 408, a pilot signal obtained by the demodulation unit 404, and the receiving power information obtained by the RF processing unit.

Further, the mobile relay station 4 includes a statistical processing unit 410, a threshold value setting unit 411, and a deviation judgment unit 412 (detecting unit). The statistical processing unit 410 performs statistical processing on a communication quality measurement value that is notified from the communication quality measurement unit 409 and analyzes the change of transmission power, the SINR or the like when the mobile terminal 3 has deviated from the coverage area of the mobile relay station 4. The threshold value setting unit 411 sets a threshold value of the communication quality measurement value (corresponding to the predetermined condition) that is extracted when the access link communication from the mobile communication terminal 3 is received and processed in order to judge whether or not the mobile communication terminal 3 belonging to the mobile relay station 4 has deviated from the mobile relay station 4. The deviation judgment unit 412 compares the threshold value of the communication quality notified from the threshold value setting unit 411 with the measurement value of the communication quality notified from the communication quality measurement unit 409 in order to judge whether or not the mobile communication terminal 3 has deviated from the mobile relay station 4.

In the present embodiment, the threshold value set by the threshold value setting unit 411 is determined by characteristics such as a coverage range of the mobile relay station 4, the physical size and shape of the vehicle or the like to be mounted. For example, the threshold value is a parameter of the case when the distance between the mobile relay station 4 and the mobile communication terminal 3 changes rapidly (corresponding to the change of communication environment in the present embodiment), and the mobile communication terminal 3 is considered to leave the coverage area of the mobile relay station 4 within a short time. This value can be predetermined by, for example, an administrator of the mobile relay station 4, or can be determined according to the result of the statistical processing performed by the statistical processing unit 410 (e.g., an interference amount of the communication by traffic congestion). For example, the value is determined by obtaining an average value and a rate of change of the parameter of the communication quality when the mobile relay station 4 and the mobile communication terminal 3 are moving together.

Further, the mobile relay station 4 includes a communication control unit 413 that controls the communication between the fixed wireless base station 2 and the mobile communication terminal 3. The communication control unit 413 performs operational control of each block of the mobile relay station 4 based on the control information extracted by the control information extracting unit 406, the error detection result detected by the error detecting unit 408, the communication quality measurement result measured by the communication quality measurement unit 409 or the like. For example, the communication control unit 413 forms transmission power control information based on the SINR measurement result. In FIG. 2, the description of a flow of the control signal from the communication control unit 413 to each block is partially omitted.

Further, the mobile relay station 4 includes a connection control unit 414 (control unit) that controls the connection of the fixed wireless base station 2 or the mobile communication terminal 3 based on the information from the deviation judgment unit 412, the control information extracting unit 406, and the communication control unit 413. The connection control unit 414 manages and generates the information necessary for connection control such as entry and handover of the mobile communication terminal 3 based on, for example, the control information extracted by the control information extracting unit 406, the determination result of the deviation judgment unit 412, and the transmission power control information formed by the communication control unit 413.

Further, the mobile relay station 4 includes a control information generating unit 415. The control information generating unit 415 generates each of the control information for the communication necessary for performing the relay link communication with the fixed wireless base station 2 and the access link communication with the mobile communication terminal 3 based on the information generated by the communication control unit 413 or the connection control unit 414.

Further, the mobile relay station 4 includes a relay data generating unit 416 that generates data exchanged between the fixed wireless base station 2 and the mobile communication terminal 3, a data encoding unit 417 that encodes the generated data or the like, and a modulation unit 418 that modulates a signal. When receiving an instruction from the communication control unit 413, the relay data generating unit 416 generates data to be relay-transmitted based on the user data extracted by the user data extracting unit 407. Receiving the instruction from the communication control unit 413, the data encoding unit 417 encodes the data generated by the relay data generating unit 416 based on the control information generated by the control information generating unit 415 and then adds the CRC information or the like to the data. The modulation unit 418 modulates the data, encoded by the data encoding unit 417, based on the control information generated by the control information generating unit 415, and then transmits the data to the RF processing unit 403. The data transmitted to the RF processing unit 403 is transmitted to the fixed wireless base station 2 or the mobile communication terminal 3.

In the present embodiment, the mobile relay station 4 performs functions of both the relay station and the communication control apparatus. In the present embodiment, of the configuration elements (blocks) included in the mobile relay station 4 described above, the deviation judgment unit 412 and the connection control unit 414 mainly play a role as the communication control apparatus. Further, the RF processing unit 403, the demodulation unit 404, the data decoding unit 405, the user data extracting unit 407, the relay data generating unit 416, the data decoding unit 417, the modulation unit 418 and the like play a role as the relay station of the present invention.

Figure 3:
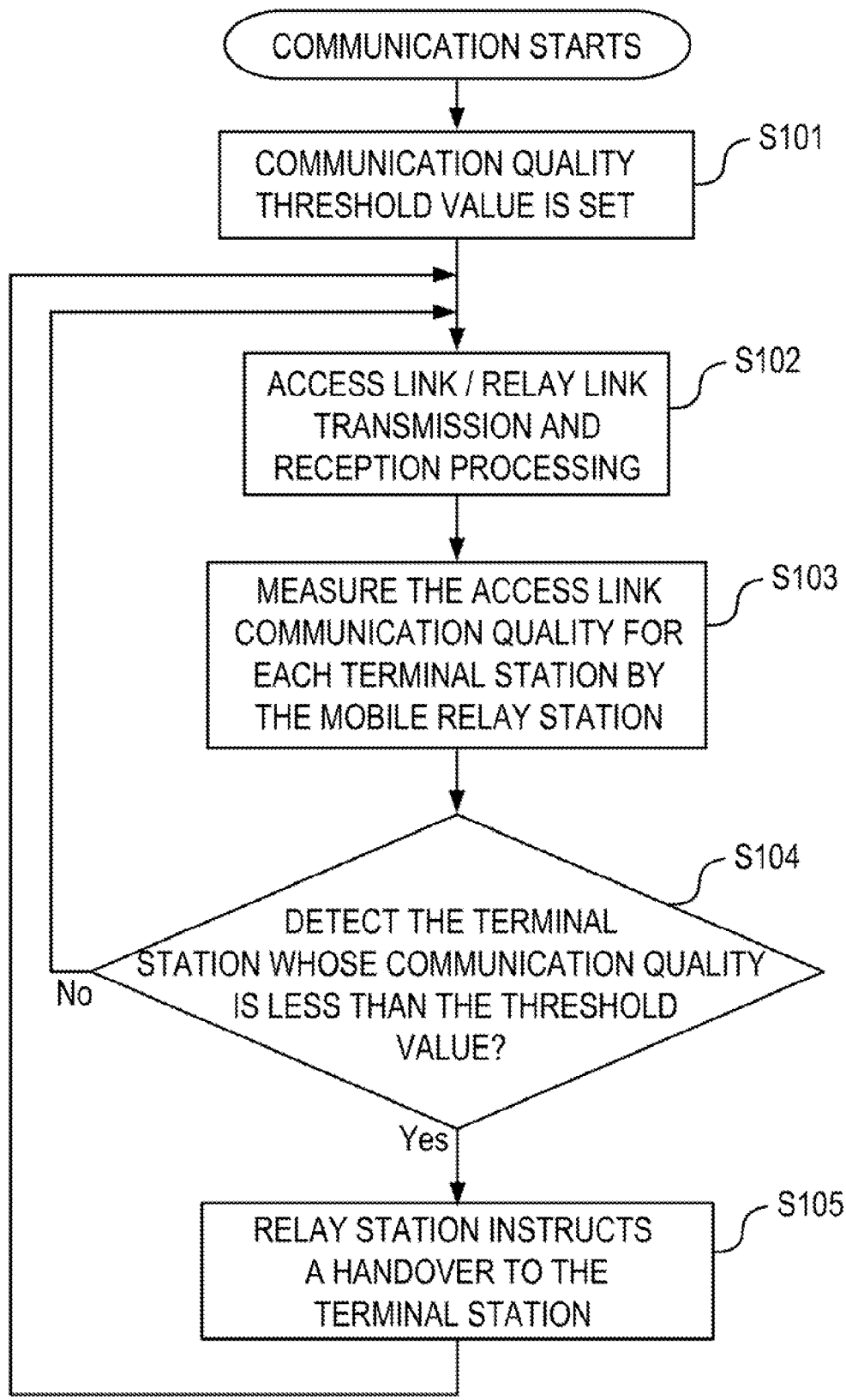
FIG. 3 is an operational flow diagram of the mobile relay station of the first embodiment.

Next, description is made of an operational flow example of the mobile relay station 4. FIG. 3 is an operation flow diagram of the mobile relay station 4. With reference to the flow diagram of FIG. 3, the operation of the mobile relay station 4 is described below. In this case, a flow of the handover processing performed by the mobile relay station 4 is mainly described.

(step S101) First, a communication quality threshold value is set. The communication quality threshold value is determined by a characteristic of a vehicle or the like as described above, and is set in advance to the threshold value setting unit 411 by, for example, an administrator of the mobile relay station 4.

(step S102) Next, the mobile relay station 4 relays the communication between the fixed wireless base station 2 and the mobile communication terminal 3. That is, the mobile relay station 4 performs the relay link communication with the fixed wireless base station 2 and performs the access link communication with the mobile communication terminal 3. Specifically, when the mobile relay station 4 receives the radio wave transmitted from the fixed wireless base station 2 or the mobile communication terminal 3 by the transmission/reception duplex antenna 401, the radio wave is demodulated by the demodulation unit 404 and is decoded by the data decoding unit 405. After the communication quality measurement unit 409 or the like measures the communication quality, detects an error, and extracts the user data, relay data is generated by the relay data generating unit 416 or the like, and is transmitted to the mobile communication terminal 3 or the fixed wireless base station 2.

(step S103) In this case, the mobile relay station 4 measures the communication quality of the access link communication performed with the mobile communication terminal 3. That is, the communication quality measurement unit 409 of the mobile relay station 4 measures the quality of the communication performed with the mobile communication terminal 3 based on such as the receiving power information notified from the RF processing unit 403, the error rate information notified from the error detecting unit 408, and the pilot signal notified from the demodulation unit 404.

(step S104) Next, the mobile relay station 4 determines whether or not the communication quality of the mobile communication terminal 3 is within the range of the threshold value that is set by the threshold value setting unit 411. That is, the deviation judgment unit 412 of the mobile relay station 4 compares the communication quality measurement value of the mobile communication terminal 3 notified from the communication quality measurement unit 409 with the threshold value notified from the threshold value setting unit 411. The deviation judgment unit 412 determines that the mobile communication terminal 3 is not deviated from the coverage area of the mobile relay station if the communication quality measurement value is within the range of the threshold value. Meanwhile, the deviation judgment unit 412 determines that the mobile communication terminal 3 has deviated from the coverage area of the mobile relay station if the communication quality measurement value is not within the range of the threshold value. Until it is determined that the mobile communication terminal 3 has deviated, the mobile relay station 4 repeats the processing of step S102 to maintain the relay of the communication between the fixed wireless base station 2 and the mobile communication terminal 3. If it is determined that the mobile communication terminal 3 has deviated, the judgment result is notified to the connection control unit 414 from the deviation judgment unit 412, and then processing of the next step S105 is performed.

(step S105) If a deviation of the mobile communication terminal 3 is detected, the mobile relay station 4 instructs a handover to the mobile communication terminal 3. That is, if the deviation of the mobile communication terminal 3 is notified from the deviation judgment unit 412, the connection control unit 414 of the mobile relay station 4 generates connection control information indicating an instruction to start the handover to the mobile communication terminal 3. A start instruction of handover generated by the connection control unit 414 is transmitted to the mobile communication terminal 3 through the control information generating unit 415, the modulation unit 418, the RF processing unit or the like. The mobile communication terminal 3 receiving the start instruction of handover searches a handover destination and performs the handover to the fixed wireless base station 2 or another mobile relay station. Accordingly, the handover performed by the control process of the mobile relay station 4 is completed.

According to the above described embodiment, the handover is performed by the control process of the mobile relay station when the mobile terminal whose communication is relayed by the mobile relay station has deviated from the mobile relay station. Therefore, for example, even if the mobile terminal that has been moving together with the mobile relay station starts moving away from the mobile relay station at high speed, it is possible to perform the handover without disconnecting the communication between the mobile station and the base station.

Figure 4:
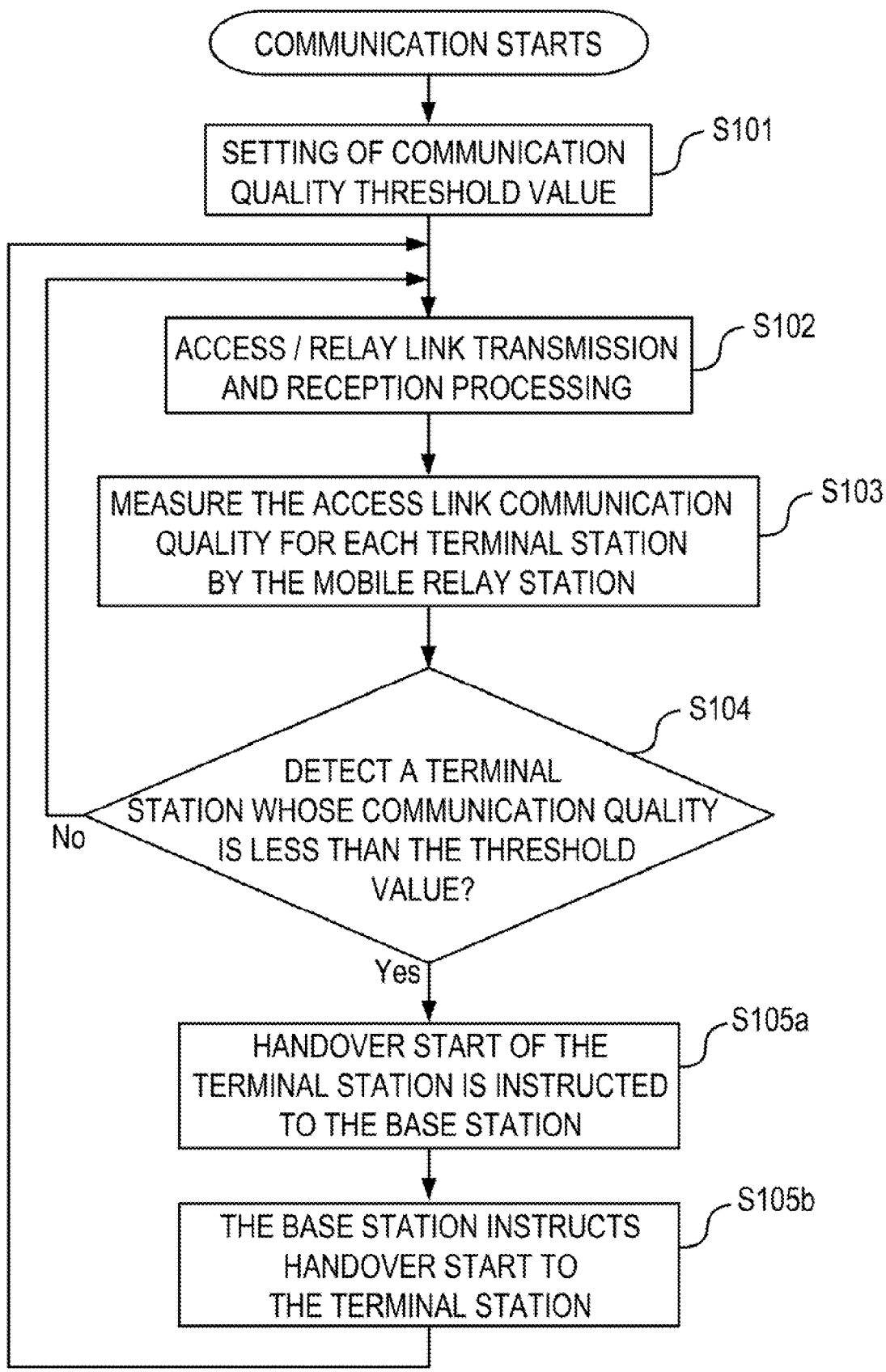
FIG. 4 is an operational flow diagram of the mobile relay station of the first embodiment (Deformation example 1)

FIG. 4 discloses an operational flow of the operation formed by deforming the above described operation (Deformation example 1). In step S105 of the above described flow example, the mobile relay station instructs the start instruction of handover directly to the mobile terminal. However, the start instruction of handover instructed by the mobile relay station to the mobile terminal can be performed through the base station. Description is made below of a difference with the above described embodiment.

As shown in FIG. 4, if a deviation of the mobile communication terminal 3 is detected in step S104, the mobile relay station 4 transmits the start instruction of handover to the fixed wireless base station 2 (step S105a). That is, if the deviation of the mobile communication terminal 3 is notified from the deviation judgment unit 412, the connection control unit 414 of the mobile relay station 4 generates the connection control information indicating the instruction to start the handover to the mobile communication terminal 3. The start instruction of handover generated by the connection control unit 414 is transmitted to the fixed wireless base station 2 through the control information generation unit 415, the modulation unit 418, the RF processing unit 403 or the like.

The fixed wireless base station 2 receiving the start instruction of handover transmits the received start instruction of handover to the mobile communication terminal 3 (step S105b). The mobile communication terminal 3 that receives the start instruction of handover from the fixed wireless base station 2 searches a handover destination and then performs the handover to the fixed wireless base station 2 or another relay station. Accordingly, the handover is completed.

By performing the start instruction of handover from the mobile relay station to the mobile terminal through the base station, it is possible to instruct the start of handover without fail even if the communication quality between the mobile relay station and the mobile terminal is extremely inferior.

Figure 5:
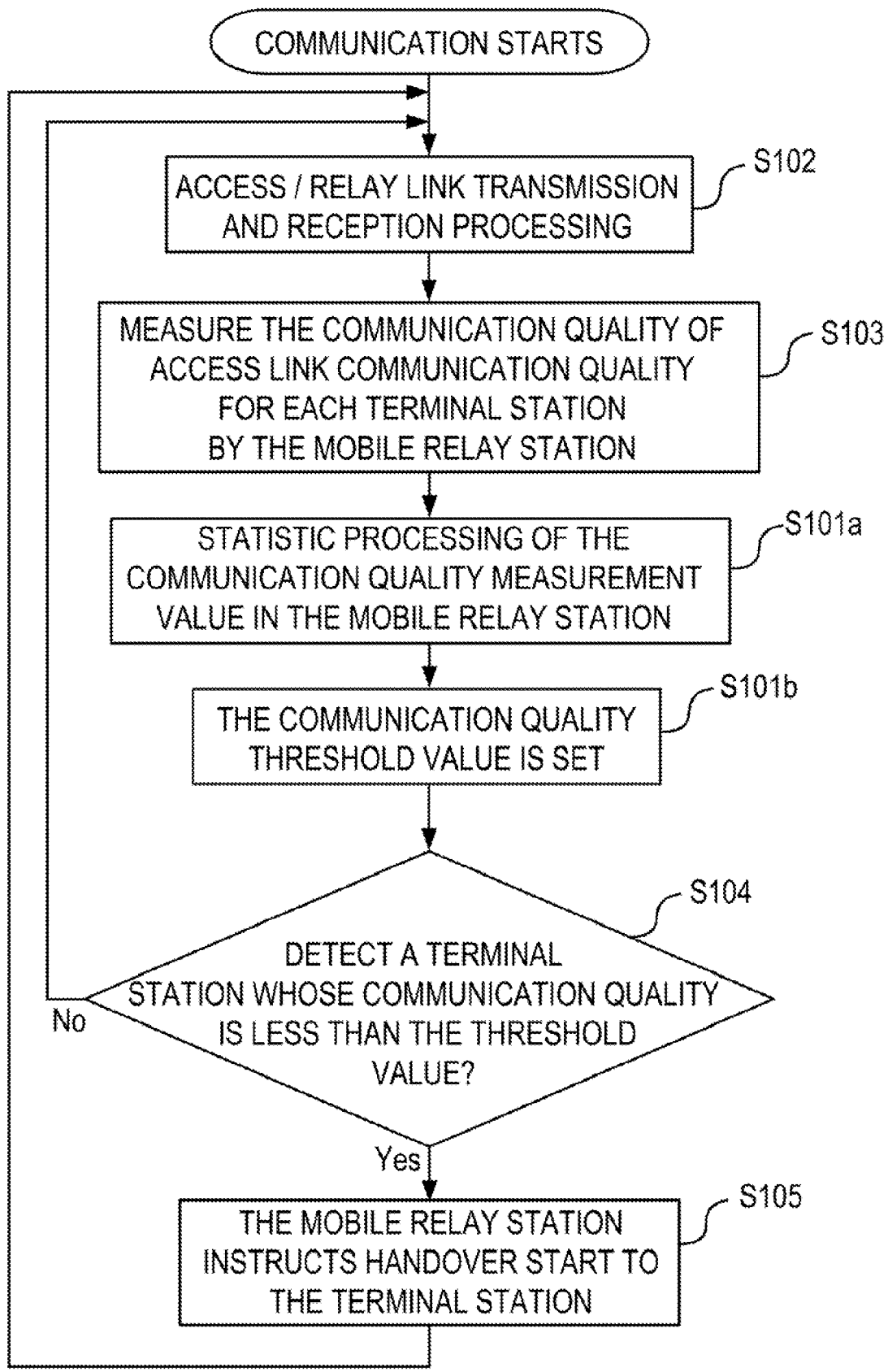
FIG. 5 is an operational flow diagram of the mobile relay station of the first embodiment (Deformation example 2)

FIG. 5 shows an operational flow example of the operation formed by deforming the operation of the above described embodiment (Deformation example 2). In the above described operational flow example, the threshold value is set in advanced before the transmission/reception processing starts. However, by performing the statistical processing on the communication quality after the transmission/reception processing starts, the threshold value can be determined based on the result. Description is made below of a difference with the above described embodiment.

As depicted in FIG. 5, the mobile relay station 4 performs access/relay link transmission/reception processing (step S102) without setting the threshold value (step S101). Then the mobile relay station 4 measures the communication quality between the mobile communication terminal 3 and the mobile relay station 4 (step S103).

At this time, the mobile relay station 4 performs the statistical processing on the measurement result of the communication quality (step S101a). That is, the statistical processing unit 410 obtains the communication quality information notified from the communication quality measurement unit 409. The statistical processing unit 410 performs the statistical processing on the obtained communication quality information. The statistical processing unit 410 outputs a result indicating that traffic is congested if the communication quality information indicates an increase of a communication assignment interval, and outputs a result indicating that the mobile communication terminal 3 has deviated from the mobile relay station 4 if the communication quality information indicates rapidity of the Doppler shift.

Next, the mobile relay station 4 sets the threshold value based on the result of the statistical processing (step S101b). That is, the threshold value setting unit 411 obtains the statistical processing result notified from by the statistical processing unit 410. The threshold value setting unit 411 analyzes the statistical processing result notified from the statistical processing unit 410 and then determines the threshold value for judging the deviation of the mobile communication terminal 3. When the statistical processing result notified from the statistical processing unit 410 indicates that the traffic is congested or that the mobile communication terminal 3 has deviated from the mobile relay station 4 rapidly, the threshold value setting unit 411 performs the handover. By setting the threshold value low, handover may be performed if the mobile communication terminal 3 slightly deviates from the mobile relay station 4. The operational flow example (step S104 to step S105) of the mobile relay station 4 after the setting of the threshold value is the same as that of the above described embodiment.

According to the present deformation example, the threshold value is set based on the statistical processing result. This makes it possible to perform handover control in accordance with the change of communication environment around the mobile relay station associated with the movement and the like of the mobile relay station.

[b] Second Embodiment

A second embodiment is described below. In the first embodiment described above, the mobile relay station side determines the necessity of handover. The present embodiment is different from the above described first embodiment in that the base station side determines the necessity of handover. For convenience sake of description, a configuration element having the same function as that of the above described first embodiment is given the same name as that of the first embodiment, and the detailed description is omitted.

Figure 6:
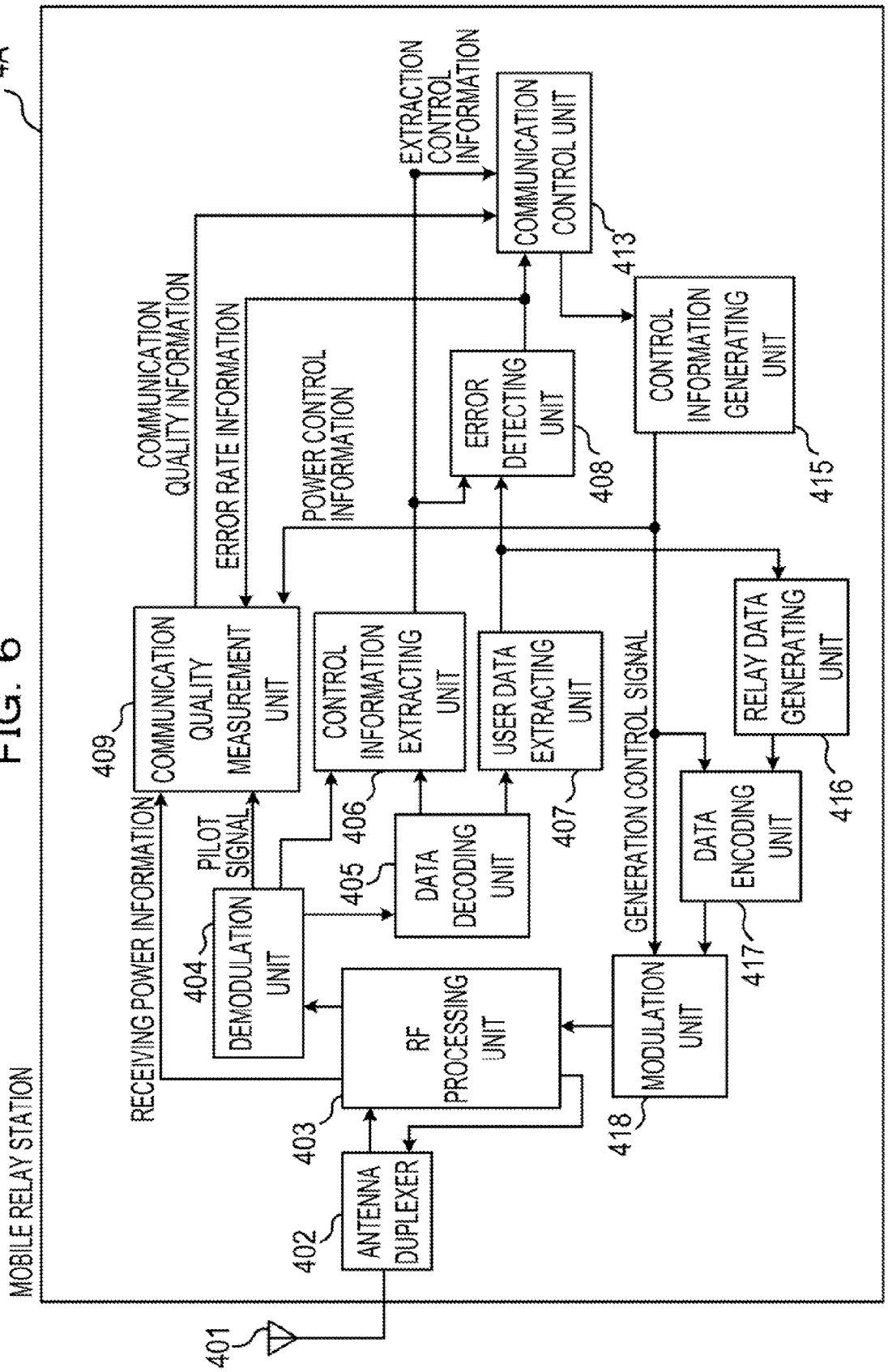
FIG. 6 is a diagram showing a configuration example of a mobile relay station of a second embodiment.

FIG. 6 is an example configuration of a mobile relay station 4A (relay station) according to the present embodiment. As depicted in FIG. 6, as with the mobile relay station 4 of the first embodiment, the mobile relay station 4A includes the transmission/reception duplex antenna 401, the antenna duplexer 402, the RF processing unit 403, the demodulation unit 404, the data decoding unit 405, the control information extracting unit 406, the user data extracting unit 407, the error detecting unit 408, the communication quality measurement unit 409, the communication control unit 413, the control information generating unit 415, the relay data generating unit 416, the data encoding unit 417, and the modulation unit 418.

Meanwhile, the mobile relay station 4A according to the present embodiment does not include a statistical processing unit, a threshold value setting unit, a deviation judgment unit, and a connection control unit. That is, the information of the communication quality, obtained by the communication quality measurement unit 409, between the mobile communication terminal 3 and the mobile relay station 4A is transmitted to the communication control unit 413 without being transmitted to the statistical processing unit 410, the deviation judgment unit 412 and the like, and is then transmitted to the base station through the control information generating unit 415, the modulation unit 418, or the like in the relay link communication.

Figure 7:
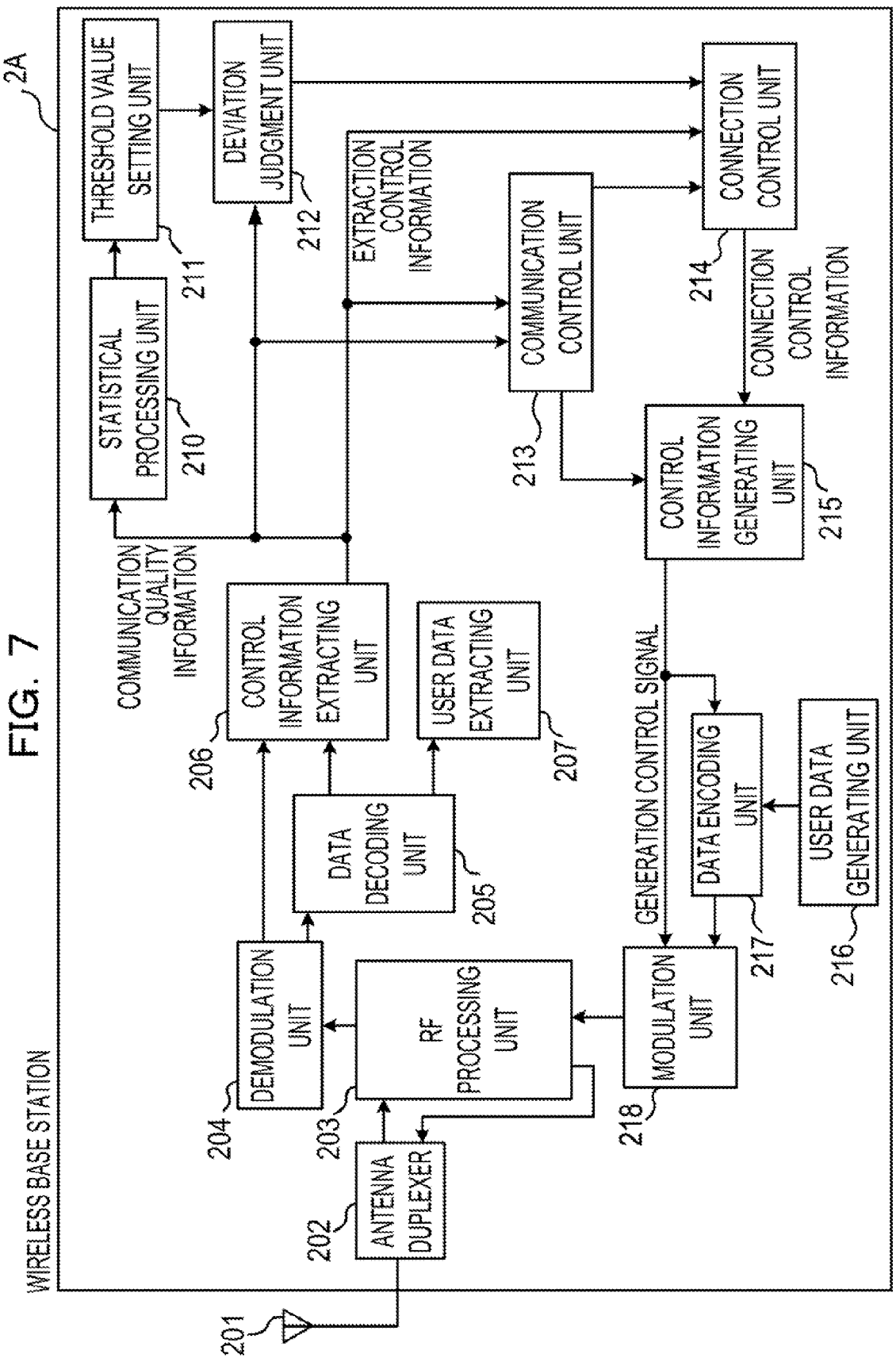
FIG. 7 is a diagram showing a configuration example of a base station of the second embodiment.

FIG. 7 is an example configuration of a fixed wireless base station 2A according to the present embodiment. As shown in FIG. 7, the fixed wireless base station 2A includes a transmission/reception duplex antenna 201, an antenna duplexer 202, an RF processing unit 203, a demodulation unit 204, and a data decoding unit 205. Unlike the RF processing unit 403 according to the first embodiment described above, the RF processing unit 203 does not output receiving power information. Further, the demodulation unit 204 does not output a pilot signal. This is because the handover instruction performed by the fixed wireless base station 2A to the mobile communication terminal 3 is performed according to the communication quality between the mobile communication terminal 3 and the mobile relay station 4A, and the communication quality between the mobile relay station 4A and the fixed wireless base station 2A is irrelevant.

Further, the fixed wireless base station 2A includes a control information extracting unit 206 that obtains communication quality information and extraction control information from the information that is modulated by the demodulation unit 204 and is decoded by the data decoding unit 205 and a user data extracting unit 207 that obtains the user data. The communication quality information that is to be extracted by the control information extracting unit 206 relates to the communication quality between the mobile communication terminal 3 and the mobile relay station 4A, notified from the mobile relay station 4A by the relay link communication. The communication quality information includes, for example, information related to the transmission power or the like. The communication quality information includes one or more parameters corresponding to the parameter that is set to a threshold value setting unit 211.

Further, the fixed wireless base station 2A includes a statistical processing unit 210, a threshold value setting unit 211, a deviation judgment unit 212 (corresponding to the detecting unit), a communication control unit 213, and a connection control unit 214 (corresponding to the control unit). Unlike the first embodiment described above in which the communication quality information is not obtained from the communication quality measurement unit, the statistical processing unit 210 and the deviation judgment unit 212 obtain the communication quality information from the control information extracting unit 206. After obtaining the communication quality information, the deviation judgment unit 212 compares the threshold value, notified from the threshold value setting unit 211, with the communication quality information to determine whether or not the mobile communication terminal 3 has deviated from the coverage area of the mobile relay station 4A. A setting process of the threshold value to be performed by the threshold value setting unit 211 is substantially the same as that of the first embodiment. The connection control unit 214 manages and generates the information, which is necessary for a connection control such as entry and handover of the mobile terminal, based on the judgment result notified from the deviation judgment unit 212, the control information notified from the control information extracting unit 206, the transmission power control information generated by the communication control unit 213 or the like.

Further, the fixed wireless base station 2A includes a control information generating unit 215, a user data generating unit 216, a data encoding unit 217, and a modulation unit 218. The user data generating unit 216 generates data to be transmitted to the mobile terminal based on the information transmitted from an upper device 6. As with the first embodiment described above, the control information generating unit 215 generates each control information based on the information generated by the communication control unit 213 and the connection control unit 214. The control information generated by the control information generating unit 215 and the data generated by the user data generating unit 216 are transmitted to the mobile relay station 4A through the data encoding unit 217, the modulation unit 218, and the RF processing unit 203.

In the present embodiment, the fixed wireless base station 2A performs functions of both the fixed base station and the communication control apparatus. In the present embodiment, of the configuration elements included in the above described fixed wireless base station 2A, the deviation judgment unit 212, the connection control unit 214 and the like, mainly play a role as the communication control apparatus in the present invention. Further, the RF processing unit 203, a demodulation unit 204, a data decoding unit 205, a user data extracting unit 207, a data encoding unit 217, a demodulation unit 218 and the like play a role as the fixed base station.

Figure 8:
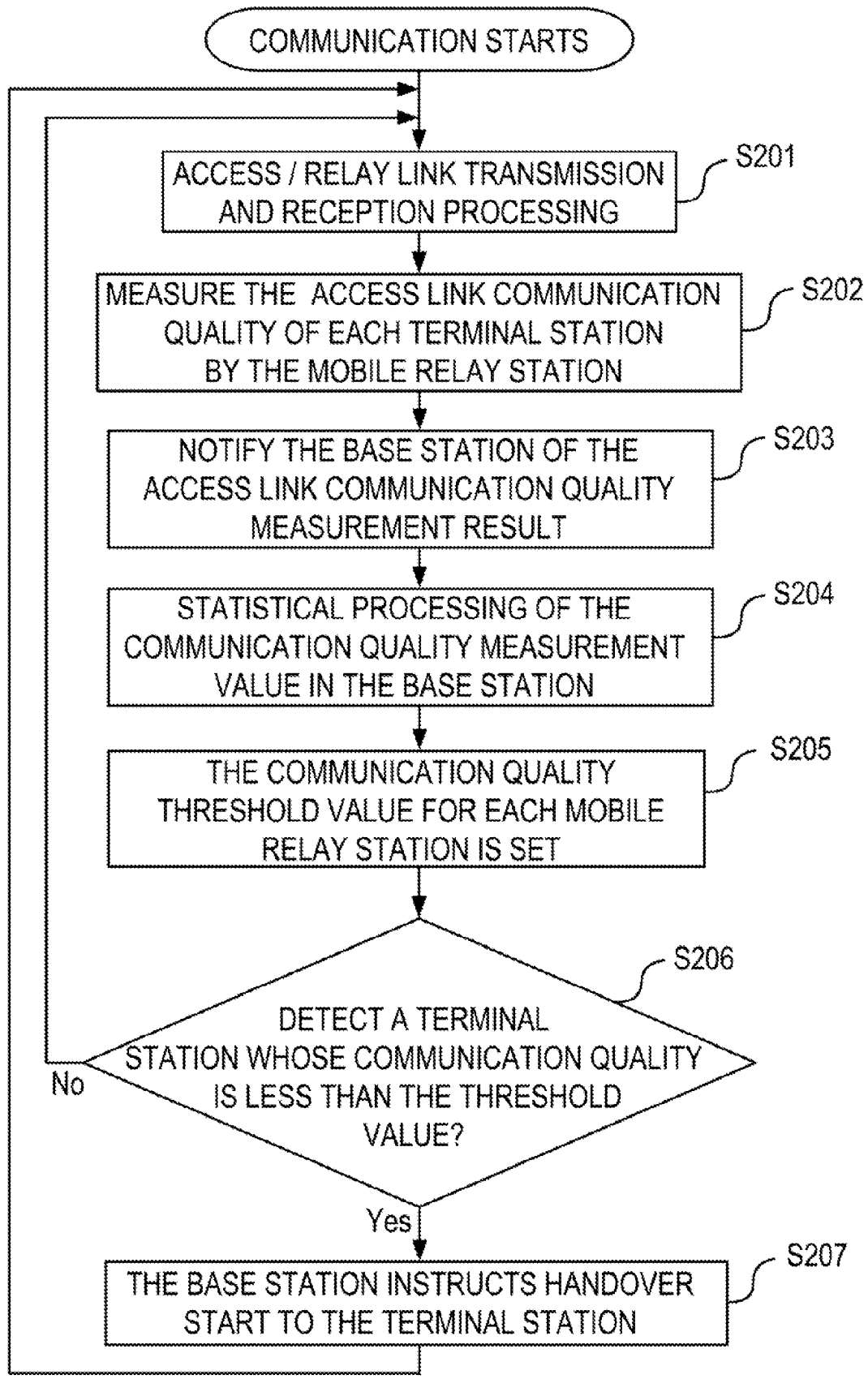
FIG. 8 is an operation flow diagram of the mobile relay station and the base station of the second embodiment.

Next, an operational flow example of the mobile relay station 4A and the fixed wireless base station 2A is described. FIG. 8 is an operational flow of the mobile relay station 4A and the fixed wireless base station 2A. With reference to the flow diagram of FIG. 8, an operation of the mobile relay station 4A and the fixed wireless base station 2A is described below. In this case, a flow of the handover processing performed by the mobile relay station 4A in cooperation with the fixed wireless base station 2A is mainly described.

(step S201) The mobile relay station 4A relays the communication between the fixed wireless base station 2A and the mobile communication terminal 3. The fixed wireless base station 2A transmits a communication signal transmitted from the mobile relay station 4A to an exchanging apparatus that is not shown in the figure, and then transmits the communication signal transmitted from the exchanging apparatus to the mobile relay station 4A. That is, the fixed wireless base station 2A performs the relay link communication with the mobile relay station 4A. Further, the mobile relay station 4A performs the access link communication with the mobile communication terminal 3.

(step S202) The mobile relay station 4A measures the communication quality of the access link communication performed with the mobile communication terminal 3. That is, the communication quality measurement unit 409 of the mobile relay station 4A measures the quality of the communication performed with the mobile terminal based on the receiving power information notified from the RF processing unit 403, the error rate information notified from the error detecting unit 408, the pilot signal information notified from the demodulation unit 404 or the like.

(step S203) After measuring the quality of the communication performed with the mobile communication terminal 3, the mobile relay station 4A notifies the fixed wireless base station 2A of the measurement result by the relay link communication. That is, the communication quality information obtained by the communication quality measuring unit 409 is transmitted to the fixed wireless base station 2A through the communication control unit 413, the control information generating unit 415, the data encoding unit 417, the modulation unit 418, and the RF processing unit 403.

(step S204) The fixed wireless base station 2A performs the statistical processing to set the threshold value that is to be a standard for determining whether or not the mobile communication terminal 3 has deviated from the mobile relay station 4A. That is, the statistical processing unit 210 obtains the communication quality information notified from the control information extracting unit 206. The communication quality information obtained by the statistical processing unit 210 relates to the communication quality between the mobile communication terminal 3 and the mobile relay station 4A. The statistical processing unit 210 performs the statistical processing on the transmission power or the like of the case when the mobile communication terminal 3 has deviated from the coverage area of the mobile relay station 4A. The content of the statistical processing is the same as the deformation example 2 of the first embodiment described above.

(step S205) The fixed wireless base station 2A sets the threshold value of the communication quality of the case when the handover is performed by the mobile terminal based on the result of the statistical processing performed in step S204. The process for determining the threshold value is the same as that of the deformation example 2 of the first embodiment described above. For convenience sake of description, it is assumed that there is a single mobile relay station 4A in the coverage area of the fixed wireless base station 2A. However, there can be a plurality of mobile relay stations 4A in the coverage area of the fixed wireless base station 2A, and the fixed wireless base station 2A can perform the relay link communication with the plurality of mobile relay stations 4A. In this case, as for the threshold value that is set by performing the above described step S204 and step S205, the same value can be set to all of the mobile relay stations 4A or an individual value can be set to each of the mobile relay stations 4A.

(step S206) Next, the fixed wireless base station 2A determines whether or not the communication quality between the mobile communication terminal 3 and the mobile relay station 4A is less than the threshold value set by the threshold value setting unit 211. That is, the deviation judgment unit 212 of the fixed wireless base station 2A compares the communication quality measurement value between the mobile communication terminal 3 and the mobile relay station 4A, notified from the control information extracting unit 206, with the threshold value notified from the threshold value setting unit 211. The deviation judgment unit 212 judges that the mobile communication terminal 3 has not deviated from the coverage area of the mobile relay station 4A if the communication quality measurement value is within the range of the threshold value. Meanwhile, the deviation judgment unit 212 judges that the mobile communication terminal 3 has deviated from the coverage area of the mobile relay station 4A if the communication quality measurement value is not within the range of the threshold value. Until it is judged that the mobile communication terminal 3 has deviated from the mobile relay station 4A, each of the steps from step S201 to step S206 is performed repeatedly in the fixed wireless base station 2A. If it is judged that the mobile communication terminal 3 has deviated from the mobile relay station 4A, the judgment result is notified from the deviation judgment unit 212 to the connection control unit 214, then processing of a next step S207 is performed.

(step S207) If it is detected that the mobile communication terminal 3 has deviated from the mobile relay station 4A, the fixed wireless base station 2A instructs the handover to the mobile communication terminal 3. That is, the connection control unit 214 of the fixed wireless base station 2A generates the connection control information indicating that the handover is instructed to the mobile communication terminal 3 when the deviation judgment unit 212 notifies that the mobile communication terminal 3 is deviated from the mobile relay station 4A. A start instruction of handover generated by the connection control unit 214 is transmitted to the mobile relay station 4A by the relay link communication through the control information generating unit 215, the modulation unit 218, the RF processing unit 203 or the like. The mobile relay station 4A transmits the start instruction of handover, transmitted from the fixed wireless base station 2A, to the mobile communication terminal 3 by the access link communication. After receiving the start instruction of handover, the mobile communication terminal 3 searches for a handover destination and then performs the handover to the fixed wireless base station 2A or another mobile relay station. Accordingly, the handover by the control process of the fixed wireless base station 2A is completed.

According to the above described embodiment, as well as the similar effect as that of the first embodiment, the following effect is obtained. That is, according to the present embodiment, the statistical processing and deviation judgment of the communication quality are performed by the base station side, so that the configuration elements of the mobile relay station can be reduced. Therefore, the mobile relay station can be smaller. Further, by allocating equipment related to the communication control at the base station side located on the ground, stable Stage or the like, not at the mobile relay station side that moves frequently. This makes it easy to secure and manage the equipments.

[c] Third Embodiment

Description is made below of a third embodiment formed by deforming the first embodiment described above. Even though a connection control is not performed while taking into account a moving state of the mobile relay station in the first embodiment described above, the present embodiment takes into account this connection control. For convenience sake of description, the configuration elements having the same function as that of the first embodiment described above have the same name as that of the first embodiment, and the detailed description is omitted.

Figure 9:
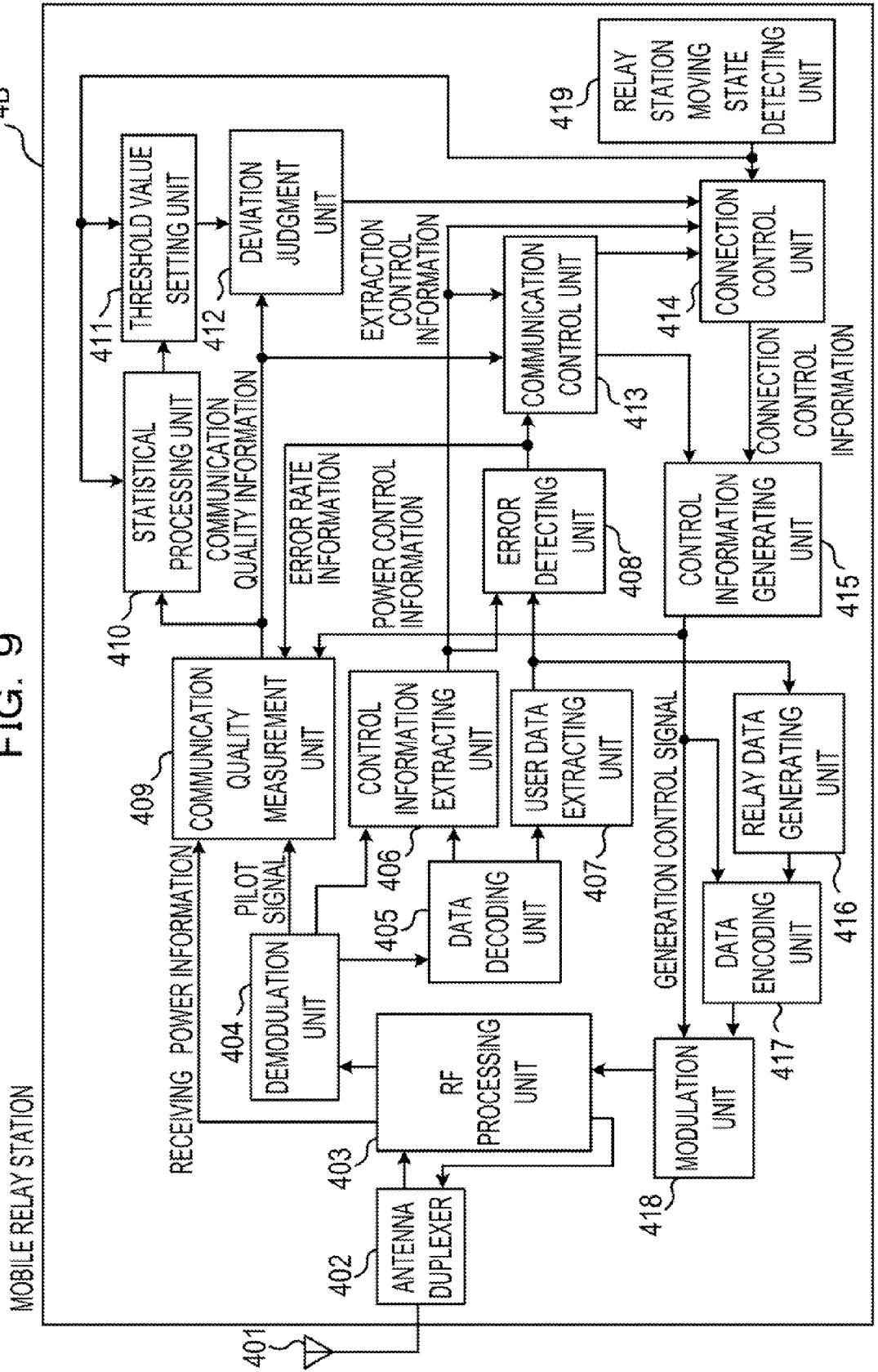
FIG. 9 is a example configuration of a mobile relay station of a third embodiment.

FIG. 9 is a diagram showing an example configuration of a mobile relay station 4B according to the present embodiment. As shown in FIG. 9, as with the mobile relay station 4 of the first embodiment, the mobile relay station 4B includes the transmission/reception duplex antenna 401, the antenna duplexer 402, the RF processing unit 403, the demodulation unit 404, the data decoding unit 405, the control information extracting unit 406, the user data extracting unit 407, the error detecting unit 408, the communication quality measurement unit 409, the statistical processing unit 410, the threshold value setting unit 411, the deviation judgment unit 412, the communication control unit 413, the control information generating unit 415, the relay data generating unit 416, the data encoding unit 417, and the modulation unit 418.

The mobile relay station 4B includes a relay station moving state detecting unit 419 that detects whether or not the mobile relay station 4B itself is moving. The relay station moving state detecting unit 419 can apply any means that can detect a movement of a vehicle 5 by using location information such as a GPS or using measurement information from a sensor located in a vehicle, a surrounding structure or the like, and what detects the movement by monitoring the quality of communication performed with the fixed wireless base station 2 as well as what detects the movement of the mobile relay station 4B by the speed sensor attached to the vehicle 5.

The relay station moving state detecting unit 419 notifies the connection control unit 414, the statistical processing unit 410, and the threshold value setting unit 411 of the relay station moving state information indicating whether or not the mobile relay station 4B is moving.

As with the first embodiment described above, the connection control unit 414 manages and generates the information necessary for the connection control of an entry, a handover or the like of the mobile communication terminal 3 based on the information notified from the deviation judgment unit 412, the control information extracting unit 406, and the communication control unit 413. At this time, the relay station moving state information notified from the relay station moving state detecting unit 419 is taken into account. Further, as with the first embodiment described above, the statistical processing unit 410 performs the statistical processing on the communication quality value, and the threshold value setting unit 411 determines the threshold value of the communication quality measurement value for performing handover processing. At this time, by taking into account the relay station moving state information notified from the relay station moving state detecting unit 419, a further analysis and threshold value determination are performed.

Next, an operational flow example of the mobile relay station 4 is described. FIG. 10 is an operational flow diagram of the mobile relay station 4B. With reference to the flow diagram of FIG. 10, an operation of the mobile relay station 4B is described below. In this case, a flow of the handover processing performed by the mobile relay station 4B is mainly described.

(step S301) The mobile relay station 4B obtains the sensor information or the like (for example, attached to the vehicle 5) in order to detect the moving state of the mobile relay station 4B itself. That is, a signal such as a vehicle speed pulse transmitted from the sensor when the vehicle 5 moves is obtained by the relay station moving state detecting unit 419.

(step S302) The mobile relay station 4B determines whether or not the mobile relay station 4B itself is in the moving state. That is, the relay station moving state detecting unit 419 analyzes the signal obtained in step S301. The relay station moving state detecting unit 419 determines that the mobile relay station 4B is moving if the vehicle 5 is moving and the obtained signal includes a spike-like pulse wave, and then notifies, to the connection control unit 414 or the like, that the mobile relay station 4B is moving. Meanwhile, the relay station moving state detecting unit 419 determines that the mobile relay station 4B is stopped when the vehicle 5 is stopped and a waveform of the received signal is a straight line, and then notifies, to the connection control unit 414 or the like, that the mobile relay station 4B is not moving.

(step S303) The mobile relay station 4B performs an ordinary mobile terminal connection control when the mobile relay station 4B determines that the mobile relay station 4B itself is not moving in step S302. That is, when the connection control unit 414 to which the information indicating that the mobile relay station 4B is not moving is notified receives a new connection request or a handover request transmitted from the mobile communication terminal 3 that newly enters the coverage area of the mobile relay station 4B and is then notified through the RF processing unit 403 and the control information extracting unit 406, the connection control unit 414 generates the information indicating that this request is permitted, and then notifies the mobile communication terminal 3 of this information through the control information generating unit 415 or the like. Therefore, the mobile communication terminal 3 that newly enters the coverage area of the mobile relay station 4B connects to the mobile relay station 4B from other base station and relay station. The mobile communication terminal 3 connected to the mobile relay station 4B performs the wireless communication with the fixed wireless base station 2 through the mobile relay station 4B. The mobile relay station 4B repeats the above described series of processing by performing the processing of step S301 again after this step is finished.

(step S304) Meanwhile, if it is determined that the mobile relay station 4B itself is moving in step S302, the mobile relay station 4B rejects the new connection and the handover from the mobile communication terminal 3 that newly enters the coverage area of the mobile relay station 4B. That is, receiving the information of the new connection request or the handover request that is transmitted from the mobile communication terminal 3 that newly enters the coverage area of the mobile relay station 4B and is then notified through the RF processing unit and the control information extracting unit 406, the connection control unit 414 to which the information indicating that the mobile relay station 4B is moved is notified generates the information indicating that the new connection request or the handover request is rejected and then notifies the mobile communication terminal 3 with the information through the control information generating unit 415 or the like. Accordingly, the mobile communication terminal 3 that newly enters the coverage area of the mobile relay station 4B maintains the connection with the base station or relay station without connecting to the mobile relay station 4B. The mobile relay station 4B repeats the above described series of processing by performing the processing of step S301 again after this step is finished.

According to the present embodiment, the new connection of the mobile terminal is rejected while the mobile relay station is moving. This prevents the mobile terminal from temporally connecting to the mobile relay station, for example, when the mobile relay station passes near the mobile terminal on the ground at high speed. The mobile terminal on the ground does not connect to the mobile relay station that is moving at high speed, which does not affect the communication quality of the mobile terminal. When the mobile relay station is stopped, the new connection of the mobile terminal is accepted. Thus, when the mobile terminal boards the stopped vehicle, the mobile terminal connects to the mobile relay station before the vehicle starts moving, and then the connection state between the mobile terminal moving together with the mobile relay station and the mobile relay station is maintained even after the vehicle starts moving. Therefore, the mobile terminal that is onboard the vehicle can keep the communication state excellent between the mobile terminal and the base station by the communication through the mobile relay station.

[d] Fourth Embodiment

Description is made below of a fourth embodiment formed by deforming the third embodiment described above. In the third embodiment described above, the connection of the mobile terminal is controlled only by the moving state of the mobile relay station. The present embodiment takes into account the moving state of the mobile terminal as well as the moving state of the mobile relay station. The moving state of the mobile terminal is detected by measuring the communication quality in the case of receiving the connection request signal transmitted from the mobile terminal. Since the configuration of the mobile relay station according to the present embodiment is to similar that of the mobile relay station of the third embodiment described above, the operational flow example, which is different from that of the third embodiment, is described below.

FIG. 11 is an operational flow diagram of the mobile relay station 4B. With reference to the flow diagram of FIG. 11, the operation of the mobile relay station 4B is described below.

(step S401) The mobile relay station 4B obtains the information of the sensor or the like (for example, attached to the vehicle 5) in order to detect the moving state of the mobile relay station 4B itself. That is, the signal of the vehicle speed pulse, the GPS or the like, transmitted from the sensor when the vehicle 5 moves, is obtained by the relay station moving state detecting unit 419.

(step S402) Next, the mobile relay station 4B judges whether or not the mobile relay station 4B itself is in the moving state. That is, the relay station moving state detecting unit 419 analyzes the signal obtained in step S401.

(step S403) The mobile relay station 4B performs an ordinary mobile terminal connection control when the mobile relay station 4B judges that the mobile relay station 4B itself is not moving in step S402. That is, when a connection request is submitted from the mobile communication terminal 3 that newly enters the coverage area of the mobile relay station 4B itself, the mobile relay station 4B accepts this request.

As described above, the series of processing from step S401 to step S403 is the same as that of the third embodiment described above.

(step S404) Meanwhile, when the mobile relay station 4B judges that the mobile relay station 4B itself is moving in step S402, the mobile relay station 4B measures the connection request signal and the request signal of handover from the mobile communication terminal 3 that attempts to newly connect to the mobile relay station 4B. That is, the communication quality measurement unit 409 measures the communication quality of the connection request signal that is transmitted from the mobile communication terminal 3 that newly enters the coverage area of the mobile relay station 4B and is then transmitted through the RF processing unit 403 or the like. The communication quality measurement unit 409 notifies, to the deviation judgment unit 412, the measurement result of the communication quality of the connection request signal or the request signal of handover which is transmitted from the mobile communication terminal 3 that newly enters the coverage area.

(step S405) The mobile relay station 4B judges whether or not the mobile communication terminal 3 that newly enters the coverage area of the mobile relay station 4B itself has or has not deviated (i.e., whether or not the mobile communication terminal 3 moves together with the mobile relay station 4 because the mobile communication terminal 3 is onboard the vehicle 5, and whether or not the mobile communication terminal 3 has deviated from the mobile relay station 4 because the mobile communication terminal 3 is on the ground). That is, the deviation judgment unit 412 judges whether or not the mobile communication terminal 3 has deviated from the mobile relay station 4 based on the measurement result of the communication quality notified from the communication quality measurement unit 409. A method for judging deviation performed by the deviation judgment unit 412 is substantially the same as that of the above described first embodiment or second embodiment. Thus, the description is omitted. The deviation judgment unit 412 notifies the connection control unit 414 of the judgment result. When the mobile communication terminal 3 has not deviated, the connection control unit 414 performs the processing of step S403 to permit an entry of the mobile communication terminal 3. Meanwhile, when the mobile communication terminal 3 has deviated, the connection control unit 414 performs the processing of step S406 to reject the entry from the mobile communication terminal 3.

(step S406) The mobile relay station 4B rejects the new connection from the mobile communication terminal 3 that newly enters the coverage area of the mobile relay station 4B when the mobile relay station 4B itself is moving and the mobile communication terminal 3 has deviated. That is, when the connection control unit 414 that is notified of the information indicating that the mobile relay station 4B is moving and the information indicating that the mobile communication terminal 3 has deviated receives the new connection request transmitted from the mobile communication terminal 3 that newly enters the coverage area of the mobile relay station 4B and the handover request, the connection control unit 414 generates the information indicating that the new connection request or the handover is rejected, and then notifies the mobile communication terminal 3 of the information through the control information generating unit 415 or the like. As a result, the mobile communication terminal 3 maintains the connection with the base station or other relay station without connecting to the mobile relay station 4.

According to the present embodiment, as well as similar effects as that of the above described third embodiment, the following effect is obtained. That is, according to the present embodiment, the connection request from the new mobile terminal that is moving together with the mobile relay station is accepted even though the mobile relay station is moving. Thus, for example, when the mobile terminal is turned off when boarding the vehicle and is then turned on while the vehicle is moving, the mobile relay station can relay the wireless communication between the mobile terminal and the base station.

Figure 13:
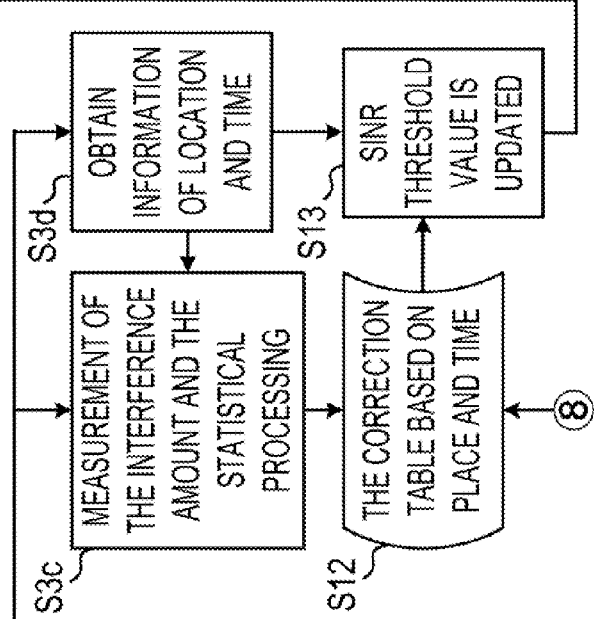
FIG. 13 is an example process to determine the threshold value.

In each embodiment above described, additional description is made below of the process for determining a threshold value. The process shown below may be applied to each of the embodiments described above. FIG. 12 shows a case to be considered to determine a threshold value and an influence of each parameter. Further, FIG. 13 shows a processing flow for determining the threshold value. For convenience sake of description, the threshold value determining process is described by an example of the case when the threshold value of the SINR is determined by using vehicle information, location information, and time information.

As disclosed in FIG. 12 (FIG. 12A and FIG. 12B), the following parameters to be considered to determine the threshold value are disclosed as examples: 1. Relay station coverage area, 2. Vehicle shape, 3. Number of connecting users, 4. Ambient surrounding, 5. Vehicle moving speed, 6. Terminal moving speed, 7. Place, and 8. Period of time.

In this case, the relay station coverage area in the first column indicates a size of the coverage area of the mobile relay station, and a parameter determined depending on an amplifying capability of the RF processing unit or the like of the mobile relay station. For example, the mobile relay station mounted on a train vehicle that is connected to many vehicles per arrangement is set to have a large coverage area to cover all the vehicles from the front vehicle to the last vehicle. If the coverage area of the mobile relay station is large, the communication is not immediately disconnected even though the distance between the vehicle and the mobile terminal starts expanding. Thus, the threshold value can be increased.

Further, the vehicle shape in the second column indicates an inner shape of the vehicle on which the mobile relay station is mounted, and a parameter that affects the communication quality between the mobile terminal and the mobile relay station when the mobile terminal that is onboard the vehicle performs the communication with the mobile relay station inside the vehicle. For example, if there are fewer shielding objects that shield the radio wave inside the vehicle, the communication quality between the mobile terminal and the mobile relay station hardly changes even though the mobile terminal moves inside the vehicle. Thus, by setting the threshold value low, sensitivity for judging deviation can be improved. On the other hand, if the inside of the vehicle is divided into private rooms and the radio wave is easily shielded, the communication quality between the mobile terminal and the mobile relay station easily changes when the mobile terminal moves inside the vehicle. This can reduce error judgment at the judgment of deviation by setting the threshold value high.

The number of connection users in the third column indicates a number of mobile terminals that communicate with the mobile relay station or the base station. More connection users cause traffic congestion, so that the interference amount increases (e.g., the case of CDMA). The communication is easily disconnected when the traffic is congested. Thus, the handover of the mobile terminal can be performed smoothly by setting the threshold value low. Further, the same is said for the case when the communication assigning interval changes (e.g., the case of TDMA).

Further, the ambient surrounding in the fourth column indicates the surroundings where the mobile relay station is moving. For example, while the mobile relay station is moving in a city area or a mountain area where the radio wave is easily shielded, the communication is easily disconnected. Thus, the threshold value is set low. Further, while the mobile relay station is moving in a suburb, plains, and an area with low population density where the radio wave is not easily shielded, the communication is not easily disconnected. Thus, the threshold value is set high. If the ambient surrounding is a parameter related to Doppler shift, the threshold value is adjusted, for example, according to the moving speed or the like of the mobile relay station that changes depending on a congestion state of a road.

Further, the vehicle moving speed in the fifth column indicates a moving speed of the vehicle on which the mobile relay station is mounted. For example, if the moving speed of the vehicle is high, the mobile terminal outside the vehicle will deviated from the mobile relay station at high speed. Therefore, it is possible to instruct the handover to the mobile terminal by setting the threshold value low in proportion to the moving speed of the vehicle. The parameter related to the Doppler shift, for example, adjusts the threshold value according to characteristics of the vehicle such as a speed of acceleration and the speed of the moving vehicle because a fluctuation width of the Doppler shift varies greatly depending on the speed of acceleration when the vehicle starts moving.

Further, the terminal moving speed in the sixth column indicates a moving speed when the mobile terminal that is onboard the vehicle on which the mobile relay station is mounted moves inside the vehicle. For example, if the vehicle type is a train or the like, where a user with the mobile terminal can easily move inside the vehicle, the communication quality may vary easily depending on the user's movement. Thus, the threshold value is set high. On the other hand, if the vehicle type is a bus or the like, where the user with the mobile terminal cannot move inside the vehicle easily, the communication quality does not change depending on the user's movement. Thus, the threshold value is set low.

Further, the place in the seventh column indicates a place where the mobile relay station is. For example, if the mobile relay station is in a train station or a bus stop where a user boards or gets off the vehicle, the deviation judgment condition is eased (the threshold value is set high). Since the deviation judgment condition is eased, no handover is instructed by mistake to the mobile terminal that is still onboard the vehicle.

Further, the time period in the eighth column indicates a period of time when the mobile relay station is relaying the communication. For example, if the time period when the communication is being relayed is the evening hours, the number of connection users decreases. Thus, the threshold value is set high. On the other hand, if the time period when the communication is being relayed is the daytime on holidays, the number of connection users increases as surrounding users increase because an event or the like is taking place. The parameter related to the Doppler shift adjusts the threshold value according to the time period because, for example, the moving speed of the vehicle varies depending on a congestion state of the traffic on the road.

Figure 13A:
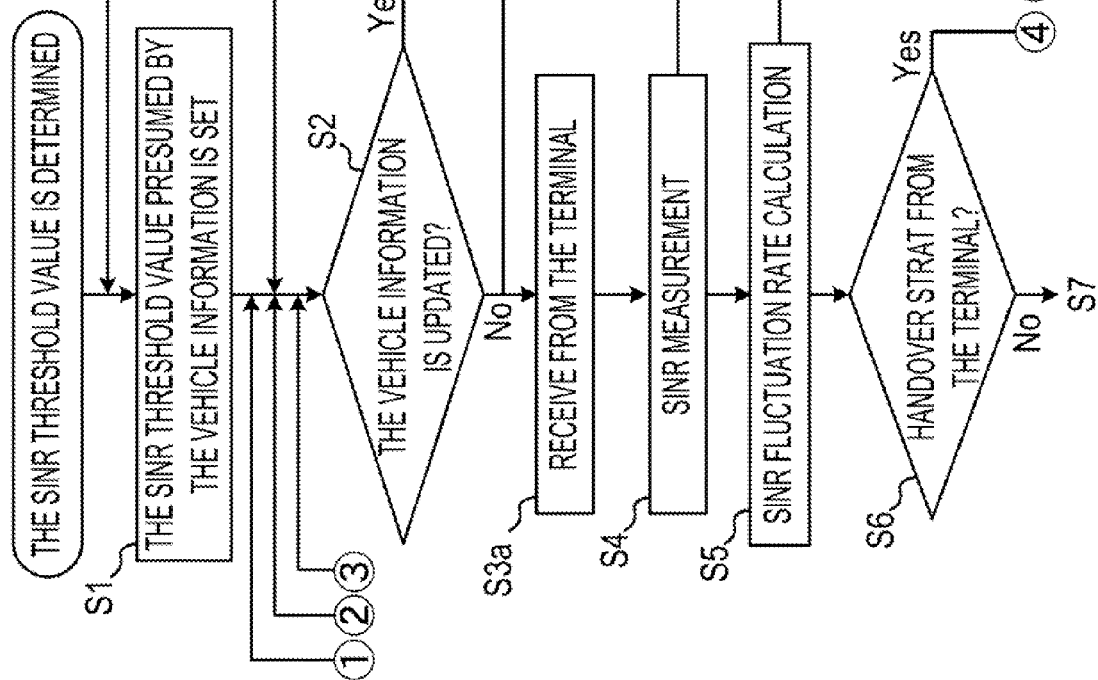
Figure 16:
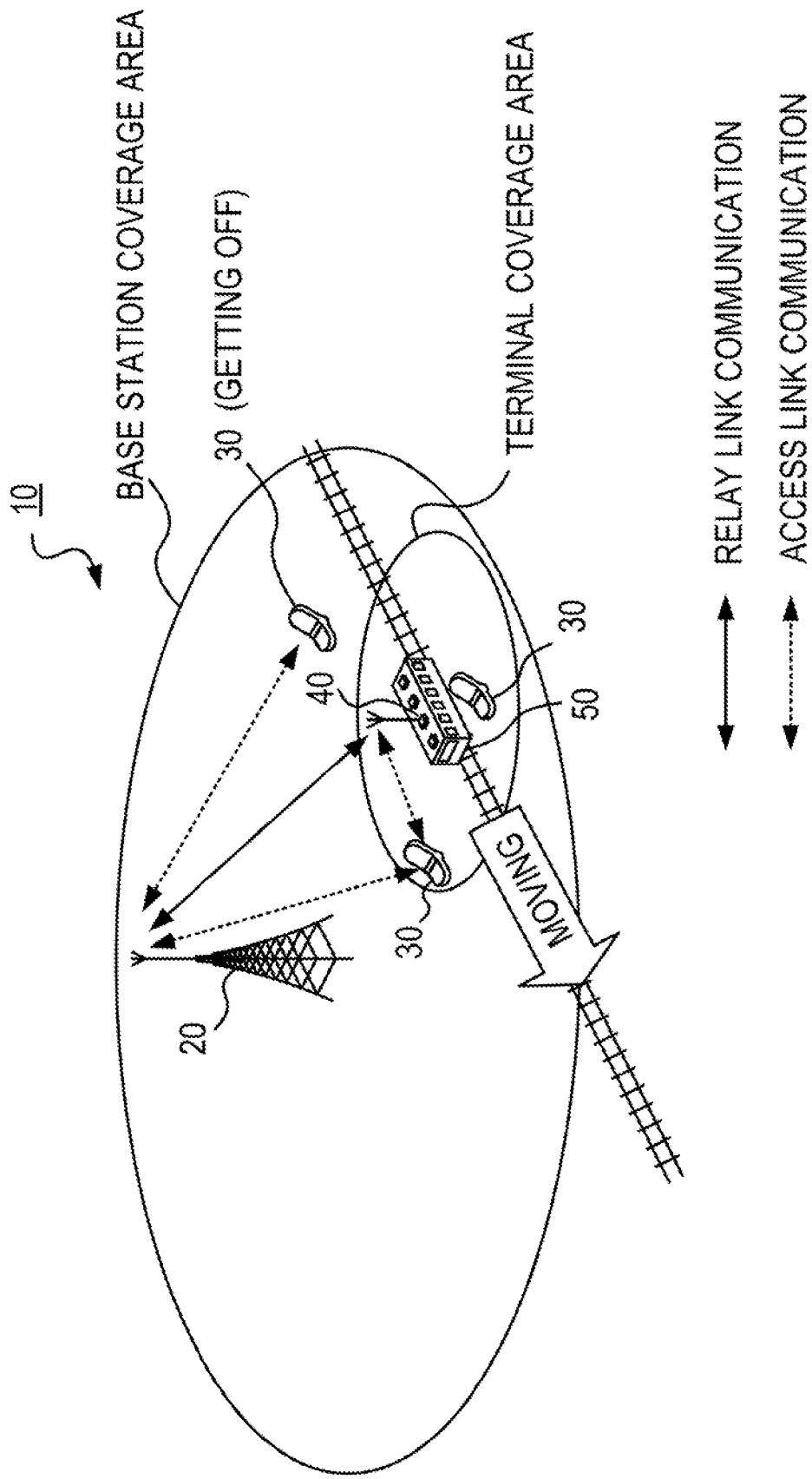
FIG. 16 is a configuration of the conventional communication system.

Next, a determining process for determining the SINR threshold value is described with reference to the flow diagram shown in FIG. 13 (FIG. 13A and FIG. 13B).

(step S1) The threshold value determining unit obtains vehicle information (corresponding to the vehicle shape in FIG. 12) and then determines the SINR threshold value that is to be a base. The threshold value determining unit obtains the vehicle information based on the information to be input by, for example, an administrator of the mobile relay station through an input device that is not shown in the figure. The threshold value determining unit notifies the deviation judgment unit of the set threshold value. The deviation judgment unit that is notified of the threshold value performs the deviation determination of the mobile terminal based on the threshold value that is set in this step until the threshold value is updated.

(step S2) When the vehicle information is updated, the threshold value determining unit again performs step S1 to obtain the vehicle information again.

(step S3) Next, the RF processing unit receives the radio wave transmitted from the mobile terminal (step S3$a$). Further, the threshold value determining unit obtains the vehicle speed pulse or the like to detect the moving speed of the vehicle (step S3$b$). Further, the communication quality measurement unit performs statistical processing on the interference amount of the radio wave or the like (step S3$c$). The threshold value determining unit obtains information of the location and the present time of the vehicle from the GPS or the like (step S3$d$). When the communication quality measurement unit performs the statistical processing in step S3$c$, the statistical processing is performed while taking into account the location of the vehicle or the like obtained by the threshold value determining unit in step S3$d$.

(step S4) Next, the communication quality measurement unit analyzes the radio wave received by the RF processing unit to measure the SINR.

(step S5) Further, the communication quality measurement unit analyzes the radio wave received by the RF processing unit to calculate an SINR fluctuation rate.

(step S6) At this time, the threshold value determining unit determines whether or not the mobile terminal itself performs the handover based on the control information extracted by the control information extracting unit or the like. The threshold value determining unit performs processing of the next step S7 if the mobile terminal itself does not perform the handover. Further, if the threshold value unit detects that the mobile terminal itself performs the handover, the processing of step S9 is performed.

(step S7) The threshold value processing unit refers to the judgment result of the deviation judgment unit or the connection control information generated by the connection control unit to judge whether or not the mobile terminal performs the handover by the control process of the mobile relay station. The threshold value determining unit again performs the processing following step S102 if the mobile terminal does not perform the handover by the control process of the mobile relay station. Further, the threshold value determining unit performs the processing of the next step S8 if the mobile terminal performs the handover by the control process of the mobile relay station.

(step S8) The threshold value determining unit determines whether or not the deviation judgment of the deviation judgment unit is wrong to verify validity of the threshold value. That is, the threshold value determining unit determines that the deviation judgment by the deviation determining unit is wrong because the threshold value is invalid when the mobile terminal again performs the handover to the mobile relay station even though the mobile relay station instructs to perform the handover to the mobile terminal. The deviation judgment unit performs the next step S9 if the deviation judgment by the deviation judgment unit is wrong. Meanwhile, the deviation judgment unit again performs the processing following step S102 if the deviation judgment result by the deviation judgment unit is valid.

(step S9) If the deviation judgment by the deviation judgment unit is wrong, the threshold value determining unit verifies the validity of the handover based on the moving speed of the vehicle obtained in step S3b, the measurement result of the SINR obtained in step S4, and the SINR fluctuation rate obtained in step S5. That is, the threshold value determining unit analyzes the moving speed of the vehicle, the SINR value, the SINR fluctuation rate of the case when the deviation judgment unit performs deviation judgment. The threshold value determining unit determines that the threshold set in step S1 is invalid if the SINR value or the like is extremely excellent values and is greater than the SINR value necessary for the mobile relay station to relay the communication between the mobile terminal and the base station. Further, the threshold value determining unit analyzes the SINR value or the like of the case when the mobile terminal itself performs the handover. The threshold value determining unit determines that the threshold value set in step S1 is invalid if the SINR value or the like is extremely inferior value and is smaller than the SINR value necessary for the mobile relay station to relay the communication between the mobile terminal and the base station.

(step S10) The threshold value determining unit determines whether or not a correction table needs to be adjusted. The threshold value determining unit performs the next step S11 if the threshold value is determined to be invalid in step S9. Meanwhile, the threshold value determining unit again performs the processing following step S2 if the threshold value is determined to be valid in step S9.

(step S11) The threshold value determining unit corrects the threshold value if the threshold value set in step S1 is determined to be invalid. That is, the threshold value determining unit sets the SINR threshold value low if the mobile terminal itself performs the handover. The threshold value determining unit sets the SINR threshold value high if the SINR value is an excellent value of the case when the deviation judgment unit judges the deviation.

(step S12) Further, the threshold value determining unit corrects the threshold value corrected in step S11 based on the statistical processing result obtained in step S3c. That is, the threshold value determining unit takes into account the statistical processing result such as a traffic congestion state and further corrects the threshold value corrected in step S11. For example, the threshold value determining unit corrects and sets the threshold value corrected in step S11 high if the traffic amount is small.

(step S13) Next, the threshold value determining unit further corrects the threshold value corrected in step S12 based on the location information or the like obtained in step S4c. For example, the threshold value determining unit corrects and sets the threshold value corrected in step S12 low if the present time and location of the vehicle is the time and place in which the number of the surrounding users is large. The threshold value determining unit notifies the deviation judgment unit of the corrected threshold value and then updates the threshold value stored in the deviation judgment unit.

The threshold value determining process is described above. The present threshold value determining process may be applied to each of the above described embodiments. However, for example, if the present threshold value determining process is applied to the first embodiment and the second embodiment in which the present location information of the vehicle or the like is not obtained, such information that is not obtained may be omitted, and then the threshold value is determined. By changing the threshold value flexibly by the present threshold value determining process, each of the above described embodiments can appropriately control the handover of the mobile terminal of the communication system in which the mobile relay station relays the communication.

As well as the parameter of the case when the threshold value is determined, the statistical processing result used to determine the threshold value can be applied to consider hysteresis of the case the handover processing is performed. That is, for example, a processing speed of the threshold value determining process can be adjusted according to the moving speed of the mobile relay station.

While the transmission path from the mobile terminal that is onboard the vehicle is almost in a static state, for example, the measurement of the communication quality can use the fact that receiving from the mobile terminal deviated from the mobile relay station becomes multi-path fading or frequency-selective fading depending on the change of the surrounding environment. To measure a notch within the used frequency band in the frequency-selective fading, for example, there is a method for measuring dispersion of a plurality of pilot signals, inserted in a direction of subcarrier frequency in an OFDM communication system, as a determination standard. Further, a delay spread of the received signal is measured to be a determination standard. When the connection request signal is used for communication quality measurement, such method including a short transmission period and intermittent transmission is useful as a measuring method in the case when the moving state is difficult to be determined because of time fluctuation.

<Computer Readable Recording Medium>

A program for making a computer, an equipment, and a device (hereinafter referred to as a computer and the like) achieve one of the above described functions can be recorded in a recording medium that is readable by a computer and the like. Then the computer or the like read the program of the recording medium to be performed. Thus, the functions can be provided.

In this case, a computer readable recording medium is referred to as a recording medium that can store the information such as data and programs by functioning such as electric, magnetic, mechanic, or chemical functioning, and in which the information can be read by the computer or the like. Of these recording media, the recording medium that is removable from the computer and the like includes, for example, a flexible disk, an magnet optical disk, a CD-ROM, a CD-R/W, a DVD, a DAT, a 8 mm tape, a memory card or the like.

Further, the recording medium fixed to the computer or the like includes a hard disk, a ROM (Read Only Memory) or the like.

All examples and conditional language recited here in are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has (have) been described in detail, it should be understood that the various changes, substitutions, and alterations could be made hereto without departing from the spirit and scope of the invention.

What is claimed is:

1. A communication control apparatus that is applied to a wireless communication system in which a mobile terminal can be connected to a fixed base station through a wireless connection to a relay station that is installed to a moving body, the communication control apparatus comprising:
   a detecting unit configured to detect a change, associated with movement of the moving body to which the relay station is installed, by analyzing communication quality of wireless communication between the mobile terminal and the relay station; and
   a control unit configured to control a handover of the mobile terminal according to the change, detected by the detecting unit, of the communication quality of the wireless communication between the mobile terminal and the relay station,
   wherein the detecting unit detects whether or not the relay station and the mobile terminal are not moving together, and
   wherein the control unit rejects a new handover connection between the relay station and the mobile terminal when the control unit judges the relay station and the mobile terminal are not moving together.

2. The communication control apparatus according to claim 1, wherein the detecting unit detects the change by analyzing a communication quality between the mobile terminal and the relay station, and the control unit instructs the handover to the mobile terminal if the communication quality deviates from a predetermined condition.

3. The communication control apparatus according to claim 1, wherein the detecting unit detects the change by analyzing the communication quality between the mobile terminal and the relay station, and the control unit instructs the handover to the mobile terminal if the communication quality deviates from a condition using a statistic parameter that is to be a standard for determining whether or not the mobile terminal maintains the wireless connection with the relay station.

4. The communication control apparatus according to claim 2, wherein the communication quality is determined by at least one of the standards: receiving power, signal power to interference plus noise power ratio, data error rate, power instruction value to the mobile terminal performing transmission power control, and Doppler shift.

5. The communication control apparatus according to claim 1, wherein the control unit permits the wireless handover connection to the relay station by the mobile terminal when the moving body is stopped and inhibits the wireless handover connection to the relay station by the mobile terminal when the moving body is moving.

6. The communication control apparatus according to claim 1, wherein the control unit permits the wireless handover connection to the relay station by the mobile terminal when the moving body is stopped or when the moving body is moving and the communication quality satisfies a predetermined condition, and inhibits the wireless handover connection to the relay station by the mobile terminal when the moving body is moving and the communication quality deviates from the predetermined condition.

7. A communication control method of a wireless communication system in which a mobile terminal can be connected to a fixed base station through a wireless connection to a relay station that is installed to a moving body, the communication control method comprising:
   detecting a change, associated with movement of the moving body to which the relay station is installed, by analyzing communication quality of wireless communication between the mobile terminal and the relay station, the change depending on whether or not the moving body is moving;
   detecting that the relay station and the mobile terminal are not moving together;
   controlling a handover of the mobile terminal according to the detected change of the communication quality of the wireless communication between the mobile terminal and the relay station; and
   rejecting a new handover connection between the relay station and the mobile terminal when detected that the relay station and the mobile terminal are not moving together.

8. The communication control method according to claim 7, the communication control method detects the change by analyzing the communication quality between the mobile terminal and relay station, and instructs the handover to the mobile terminal if the communication quality deviates from a predetermined condition.

9. The communication control method according to claim 7, the communication control method detects the change by analyzing the communication quality between the mobile terminal and relay station, and instructs the handover to the mobile terminal if the communication quality deviates from a predetermined condition using a statistic parameter that is to be the standard for determining whether or not the mobile terminal maintains the wireless connection with the relay station.

10. The communication control method according to claim 8, wherein the communication quality is determined by at least one of the standards: receiving power, signal power to interference plus noise power ratio, data error rate, power instruction value to the mobile terminal performing transmission power control, and Doppler shift.

11. The communication control method according to claim 7, wherein the communication control method permits the wireless handover connection to the relay station from the mobile terminal when the moving body is stopped, and inhibits the wireless handover connection to the relay station from the mobile terminal when the moving body is moving.

12. The communication control method according to claim 7, the communication control method further permits the wireless handover connection to the relay station from the mobile terminal when the moving body is stopped or moving and the communication quality satisfies a predetermined condition, and inhibits the wireless handover connection to the relay station from the mobile terminal when the moving body is moving and the communication quality deviates from the predetermined condition.

* * * * *